(12) United States Patent
Dimitrakos et al.

(10) Patent No.: US 9,841,981 B2
(45) Date of Patent: *Dec. 12, 2017

(54) SYSTEM AND/OR METHOD FOR ENFORCING SOFTWARE COMPLIANCE AND SELECTIVELY MODIFYING SOFTWARE DEEMED NON-COMPLIANT

(71) Applicant: BRITISH TELECOMMUNICATIONS PUBLIC LIMITED COMPANY, London (GB)

(72) Inventors: Theo Dimitrakos, London (GB); Nektarios Georgalas, London (GB); Fadi El-Moussa, London (GB); Pramod Pawar, London (GB); George Vafiadis, London (GB)

(73) Assignee: British Telecommunications PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/899,911

(22) PCT Filed: Jun. 12, 2014

(86) PCT No.: PCT/GB2014/000229
§ 371 (c)(1),
(2) Date: Dec. 18, 2015

(87) PCT Pub. No.: WO2014/202932
PCT Pub. Date: Dec. 24, 2014

(65) Prior Publication Data
US 2016/0139938 A1    May 19, 2016

(30) Foreign Application Priority Data
Jun. 19, 2013 (EP) .................................... 13250069

(51) Int. Cl.
*G06F 9/46* (2006.01)
*G06F 9/455* (2006.01)
(Continued)

(52) U.S. Cl.
CPC ........ *G06F 9/44505* (2013.01); *G06F 9/5077* (2013.01); *G06F 9/45533* (2013.01)

(58) Field of Classification Search
None
See application file for complete search history.

(56) References Cited

U.S. PATENT DOCUMENTS

2005/0125489 A1* 6/2005 Hanes ..................... G06F 8/60
709/202
2005/0125809 A1* 6/2005 Chessell ............... G06F 11/302
719/318

(Continued)

FOREIGN PATENT DOCUMENTS

EP    2 568 383    3/2013

OTHER PUBLICATIONS

International Search Report for PCT/GB2014/000229, dated Jul. 23, 2014, 2 pages.
(Continued)

*Primary Examiner* — Bradley Teets
(74) *Attorney, Agent, or Firm* — Nixon & Vanderhye PC

(57) ABSTRACT

Techniques for enforcing a compliance requirement for a software application executing in a virtualized computing environment are disclosed. An identifier identifies a resource instantiated for the application's execution. A retriever retrieves a compliance characteristic for the application. The compliance characteristic is retrieved based on the identified resource and has an associated compliance criterion based on a formal parameter. The compliance criterion defines compliant resource states. A selector selects a software (Continued)

component for providing an actual parameter corresponding to the formal parameter . An evaluator evaluates the compliance criterion using the actual parameter. An application modifier, responsive to the resource lacking a compliant resource state, modifies the software application to have a resource with a compliant state. The identifier, selector, and evaluator respond to resource changes. The selector selects the software component based on an identification of one or more data items that the software component can provide.

19 Claims, 9 Drawing Sheets

(51) Int. Cl.
*G06F 9/445* (2006.01)
*G06F 9/50* (2006.01)

(56) References Cited

U.S. PATENT DOCUMENTS

| | | |
|---|---|---|
| 2007/0006218 A1 | 1/2007 | Vinberg |
| 2007/0168919 A1* | 7/2007 | Henseler ............... G06F 8/61 717/101 |
| 2008/0222631 A1 | 9/2008 | Bhatia et al. |
| 2009/0177777 A1* | 7/2009 | Behrendt .......... G06F 17/30734 709/226 |
| 2010/0088150 A1* | 4/2010 | Mazhar ................ G06F 9/5088 717/120 |
| 2011/0252420 A1 | 10/2011 | Tung |
| 2011/0271276 A1 | 11/2011 | Ashok |
| 2011/0321033 A1* | 12/2011 | Kelkar ............... G06F 9/44505 717/174 |
| 2012/0110164 A1 | 5/2012 | Frey et al. |
| 2013/0031213 A1* | 1/2013 | Nissennboim .......... H04L 63/20 709/219 |
| 2013/0047240 A1* | 2/2013 | Radhakrishnan ... H04L 63/0807 726/9 |
| 2013/0132933 A1 | 5/2013 | Rajaram et al. |
| 2014/0007097 A1 | 1/2014 | Chin |
| 2014/0026131 A1* | 1/2014 | Ravi .................. G06F 9/44505 717/177 |
| 2014/0173580 A1* | 6/2014 | McDonald .......... G06F 11/1433 717/170 |
| 2016/0139902 A1* | 5/2016 | Dimitrakos ............. G06F 11/30 717/120 |
| 2016/0139915 A1* | 5/2016 | Dimitrakos ............... G06F 8/61 717/126 |
| 2016/0140209 A1 | 5/2016 | Dimitrakos et al. |
| 2016/0147518 A1* | 5/2016 | Dimitrakos ............... G06F 8/61 717/120 |
| 2016/0147522 A1* | 5/2016 | Dimitrakos ............... G06F 8/61 717/174 |

OTHER PUBLICATIONS

Office Action issued dated Sep. 28, 2017 in related U.S. Appl. No. 14/899,747, 30 pages.

* cited by examiner

SYSTEM AND/OR METHOD FOR ENFORCING SOFTWARE COMPLIANCE AND SELECTIVELY MODIFYING SOFTWARE DEEMED NON-COMPLIANT

This application is the U.S. national phase of International Application No. PCT/GB2014/000229 filed 12 Jun. 2014, which designates the U.S. and claims priority to EP Patent Application No. 13250069.5 filed 19 Jun. 2013, the entire contents of each of which are hereby incorporated by reference.

TECHNICAL FIELD

The present invention in certain example embodiments relates to software compliance. In particular, it relates to enforcement of compliance requirements for software applications in virtualized computing environments.

BACKGROUND AND SUMMARY

There is an increasing trend towards the deployment of software applications using software and hardware infrastructures and platforms offered by service providers as services.

Infrastructure as a Service (IaaS) providers offer resources such as hardware or virtualized hardware environments for the deployment of software platforms and applications. IaaS infrastructures can include, inter alia, resources such as hypervisors, storage resources, load balancing resources and network resources. Platform as a Service (PaaS) providers offer platform resources such as, inter alia, operating systems, execution runtime environments, databases, middleware, network services such as web servers and development tools.

Infrastructure and platform services can be implemented so as to abstract any particular deployed application from underlying resources employed. A software application may require specific resources, for example a specific operating system, execution environment, database and web server. The application can be deployed to a platform provided by a platform service provider, the platform having potentially many and numerous alternative resources being selected and configured to satisfy the specific requirements of the application. Further, the platform itself can operate with an infrastructure provided by an infrastructure service provider, certain attributes and resources of which may be at least partly specified for the application. The infrastructure may also have many and numerous alternative resources being selected and configured to satisfy the requirements of the platform and the application. Thus, an application deployment can involve a multiplicity of interconnected resources selected from a potentially greater number of available resources at each of the application, platform and infrastructure level.

A feature of such service-based technologies is that resources can be arranged in a localized or distributed manner. Distributed resources, such as distributed hardware cooperating or managed through physical or logical network arrangements, can provide for the distribution of resources such as, inter alia, distributed execution environments, distributed web servers and distributed database software.

A further feature of such service-based technologies is that resources can be provided in a virtualized manner such as a software implementation of a resource. Thus a hardware device such as a computer system or storage device can be provided as a virtualized device such as a software implementation of a computer system or storage device. Such virtual resources present an abstraction of underlying actual hardware. For example, a computer system resource executing a particular operating system can be provided as a virtual machine {VM) executing with a hypervisor on a hardware device or, potentially, a distributed arrangement of hardware devices. Examples of hypervisor's include native hypervisors that execute in conjunction with specific hardware such as Oracle VM Server for SPARC, Oracle VM Server for x86, the Citrix XenServer, VMware ESX/ESXi, KVM, and Microsoft Hyper-V {Oracle, Oracle VM Server and SPARC are trademarks or registered trademarks of Oracle Corp. in some countries. Citrix and XenServer are trademarks or registered trademarks of Citrix Systems, Inc in some countries. VMware is a trademark or registered trademark of VMware, Inc in some countries. Microsoft and Hyper-V are trademarks or registered trademarks of Microsoft Corp. in some countries.) Additionally, hypervisors can be hosted in existing operating environments, for example BHyVe, VMware Workstation and VirtualBox {VirtualBox is a trademark or registered trademark of Oracle Corp.)

One example of the use of such service-based technologies to deploy software applications is Cloud Computing. Cloud Computing uses hardware and software resources provided as a service over a network, such as the internet. For example, Cloud Computing service providers can employ IaaS and PaaS to provide Cloud Computing services for the deployment of software applications. Applications themselves can also be provided as services (known as Software as a Service or SaaS), such as, inter alia, email applications, office applications, social networking applications, virtual desktops, communications applications and games. Thus, applications deployed to cloud computing environments often involve the selection of IaaS and PaaS and potentially SaaS components.

A further feature of such service-based technologies is an abstraction between resource provision and resource consumption such that the deployment of an application with service-based technologies does not require, and indeed preferably does not involve, a complete understanding of the underlying mechanisms and technologies through and with which the resources are provided. Due to the potentially virtualized, distributed and abstracted nature of the services provided, there is reduced transparency of underlying technologies provided to service consumers. This reduced transparency introduces a dependency of a service consumer on the resource service providers with respect to characteristics of the resources. For example, an application requiring a certain standard of information security, security architecture, data governance or resiliency will depend on service providers to commit to satisfy such requirements and further to actually provide services satisfying the requirements. One way this can be articulated between a service provider and consumer is through a Service Level Agreement (SLA) in which service providers and consumers agree what resources will be provided and what the characteristics of those resources will be. While helpful for service consumers, SLAs provide no technical assurance that required characteristics of a particular service level are provided. Indeed the extent of a lack of transparency of a service-based technology will mean that certain resources and characteristics of resources will not be exposed to a service consumer and, accordingly, may not be readily audited by the consumer or an auditor operating on behalf of the consumer. For example, a standard of encryption used in communication between deep components in a computing platform or infrastructure, a level of security applied to data stored in a data store, or a level of security applied to computing facilities access may not be exposed or exposable to a service consumer or auditor.

The importance of required characteristics of resources cannot be understated, especially for applications having associated legal or regulatory frameworks or constraints. For example, the location and manner of storage and communication of personal information can require strict control in many territories. Similarly, a level of access control and protection against intrusion can be grounded in legal requirements. It is therefore desirable that an extent or level of compliance with required resource characteristics can be assessed.

The Cloud Security Alliance (CSA) has published a set of controls which can be used by Cloud Computing service consumers in assessing the overall security risk of a cloud provider (Cloud Security Alliance and CSA are trademarks or registered trademarks of the Cloud Security Alliance in some countries). Examples of such controls are listed in a Cloud Controls Matrix (CCM) available at cloudsecurityalliance.org/research/ccm. The controls are mapped to security standards, regulations, and controls frameworks such as: the International Organization for Standardization (ISO) information security standards 27001/27002; the Information Systems Audit and Control Association (ISACA) Control Objectives for Information and Related Technology (COBIT); the Payment Card Industry Data Security Standard (PCI DSS); standards of the National Institute of Standards and Technology (NIST) such as NIST Special Publication 800-53 "Recommended Security Controls for Federal Information Systems and Organizations"; and the North American Electric Reliability Corporation's (NERC) Critical Infrastructure Protection (PIP) (ISO is a trademark or registered trademark of the International Organization for Standardization in some countries. COBIT is a trademark or registered trademark of ISACA and The IT Governance Institute (ITGI) in some countries.) The CCM provides a reference for key compliance characteristics applicable across software applications and service-based technologies. While the CCM is helpful in assisting Cloud Computing service providers in identifying desirable characteristics, and the CCM provides a reference for Cloud Computing service consumers in defining characteristics with which compliance is required, the CCM does not provide for an assessment of an extent or level of compliance with required resource characteristics. Manual intervention is required along with service provider transparency to employ the CCM to assess compliance of required resource characteristics.

The CSA further published a Consensus Assessment Intiative (CAI) Questionnaire that provides a set of questions for each control in the CCM that a Cloud Computing service consumer may ask of a service provider (published at cloudsecurityalliance.org/research/cai). The questionnaire provides a series of "yes or no" control assertion questions which can be tailored to suit a service consumer's requirements. While the CAI Questionnaire is helpful to assist service consumers in interrogating service providers, it does not provide for an assessment of an extent or level of compliance with required resource characteristics.

The CSA has also published a network working group internet draft "CloudAudit-Automated Audit, Assertion, Assessment, and Assurance API (A6)" as Internet Engineering Task Force (IETF) draft "draft-hoff-cloudaudit-00" (Hoff et al, July 2010). CloudAudit provides a namespace and interface that allows Cloud Computing service providers to make assertions relating to compliance controls at the request of service consumers. The accuracy and appropriateness of the assertions is dependent on the mechanism for making the assertion, and the CloudAudit draft does not contemplate how such assertions are to be founded. Computer Sciences Corporation (CSC) published a précis for a mechanism for requesting and receiving information about compliance controls from Cloud Computing service providers ("A Precis for the CloudTrust Protocol", CSC, 2010) (CSC is a trademark or registered trademark of Computer Sciences Corporation in some countries.) The CloudTrust protocol (CTP) defines a "question and response protocol" for communication between Cloud Computing service consumers and Cloud Computing service providers using the CloudAudit namespace and interface. Requests relate to one of 23 defined "Elements of Transparency" where a subset of the elements relate to "evidence requests" and other elements relate to "policy introduction" requests. For example, one element of transparency can be used to request information relating to a current configuration of a hypervisor. While the CTP provides a mechanism for service consumers to request information from a service provider, it does not provide for an assessment of an extent or level of compliance with resource characteristics that can be relied upon. Cloud Computing service providers can choose whether or not to respond to CTP requests, and the response is entirely in the control of the service provider. Further, the CloudAudit interface is fallible. CloudAudit and CTP repositories may not be secure, private or integrity-guaranteed. The name system of CloudAudit and CTP may be susceptible to attack and servers may not be authenticated. CloudAudit servers may make false assertions or may refer to assertions that do not apply to them.

Additionally, service-based technologies such as Cloud Computing services and deployed applications can have a configuration or architecture that is transient in nature. A feature of service-based technologies is their scalability and "elasticity". Elasticity refers to the ability of service-based technologies to not only scale up or down as required by a deployed application, but also to transition, move, evolve, add, remove or shift services and resources in accordance with changing needs or requirement of a deployed application or service consumer. In this regard, technologies such as autonomic computing provide self-managing distributed computing resources which adapt to changes in requirements. Such scalability and elasticity of service-based technologies can mean the underlying resources employed to provide services such as IaaS, PaaS or SaaS will change. Accordingly, any change in services and/or resources will require a corresponding review of an extent or level of compliance with required resource characteristics.

US published patent application number US 2011/0321033 A1 (Kelkar et al) describes the use of an application blueprint augmented with a deployment model for the provisioning of an application. US 2011/0321033 further describes how compliance policies can be defined in the blueprint/deployment model. The mere definition of policies for an application is not sufficient for identifying or assessing an extent or level of compliance with required resource characteristics of an application. Further, in view of the elasticity of service-based technologies, providing for such an assessment as underlying services and/or resources for a deployed application change or adapt cannot be achieved by defining compliance policies in a blueprint or deployment model for application provisioning.

It would therefore be advantageous to provide a mechanism for determining an extent or level of technical compliance of a service-based technology for the deployment of a software application accounting for the elasticity of the service based technology that and without the aforementioned disadvantages.

Characteristics of the software application can be many and varied and can be distributed throughout the application. Additionally, determining a level of compliance of the software application can require information from multiple sources including the software application itself, a service based environment with which the application operates such as a virtualized computing environment, and software components operating external to both the application and the environment. Further, the elasticity of service based environments can result in changes to the configuration of a deployed application, including changes to the configuration of resources employed by the application and the use of new or alternative resources. Such changes can take place at execution time of an application and any compliance assessment conducted for an application before deployment will be outdated as soon as any such change takes place.

In accordance with a first aspect, the present invention accordingly provides an apparatus for enforcing a compliance requirement for a software application in execution in a virtualized computing environment, the apparatus comprising: an identifier component operable to identify a resource instantiated for execution of the application; a retriever component operable to retrieve a compliance characteristic for the application, the compliance characteristic being retrieved based on the identified resource and having associated a compliance criterion based on a formal parameter, the compliance criterion defining a set of compliant resource states; a first selector component operable to select a software component for providing an actual parameter corresponding to the formal parameter, the actual parameter being based on data concerning the resource; an evaluator component operable to evaluate the compliance criterion using the actual parameter; an application modifier component operable to, in response to a determination that the resource is outside the set of compliant resource states, the determination being based on the evaluation of the compliance criterion, modify the software application to a modified software application having associated a resource with a state belonging to the set of compliant resource states; and a detector component operable to detect a change to one or more of the resources, wherein the identifier component, selector component and evaluator component are operable in response to a determination by the detector component that one or more resources is changed, and wherein the selector selects the software component based on an identification of one or more data items that the software component is operable to provide.

In this way the application can be transitioned to a compliant state by modification of the application by the application modifier. Further, the operation of at least the evaluator and the application modifier can be repeated in response to changes to the application or one or more resources instantiated for the application, such as a reprovisioning of IaaS, PaaS or cloud computing resources for the application. Thus compliance can be assessed and enforced for applications operating with environments exhibiting characteristics of elasticity.

The present invention accordingly provides, in a second aspect, a method for enforcing a compliance requirement for a software application in execution in a virtualized computing environment, the method comprising: identifying a resource instantiated for execution of the application; retrieving a compliance characteristic for the application, the compliance characteristic being retrieved based on the identified resource and having associated a compliance criterion based on a formal parameter, the compliance criterion defining a set of compliant resource states; selecting a software component for providing an actual parameter corresponding to the formal parameter, the actual parameter being based on data concerning the resource; evaluating the compliance criterion using the actual parameter; in response to a first determination that the resource is changed, repeating the identifying, retrieving, selecting and evaluating steps; and in response to a second determination that the resource is outside the set of compliant resource states, the second determination being based on the evaluation of the compliance criterion, modifying the software application to a modified software application having associated a resource with, a state belonging to the set of compliant resource states, wherein the selection of the software component is based on an identification of one or more data items that the software component is operable to provide.

The present invention accordingly provides, in a third aspect, a computer program element comprising computer program code to, when loaded into a computer system and executed thereon, cause the computer to perform the steps of the method set out above.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENTS

Figure 1:
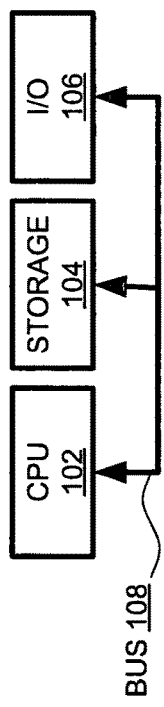
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
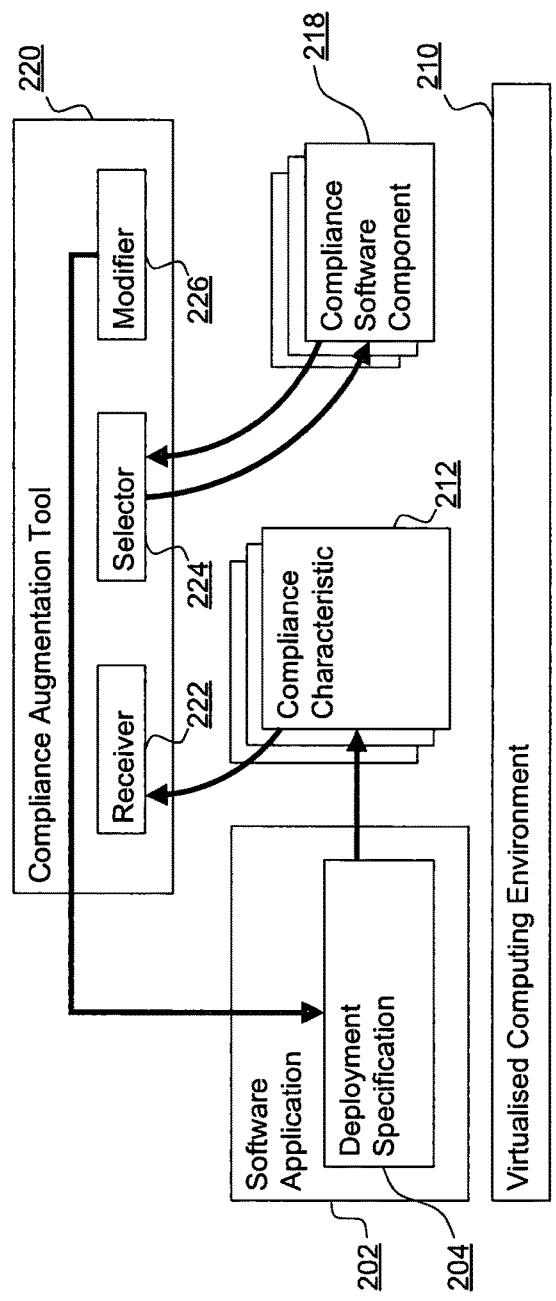
FIG. 2 is a component diagram of a compliance augmentation tool arranged to augment a deployment specification for a software application in accordance with an exemplary embodiment of the present invention.

FIG. 2 is a component diagram of a compliance augmentation tool 220 arranged to augment a deployment specification 204 for a software application 202 in accordance with an exemplary embodiment of the present invention. The compliance augmentation tool 220 is a software or hardware component operable to: receive one or more compliance characteristics 212 via receiver 222; select one or more software components 218 via selector 224; and modify the deployment specification 204 via modifier 226.

The receiver 222 is a software or hardware component operable to receive one or more compliance characteristics 212. A compliance characteristic is a characteristic of a deployed software application, such as application 202 deployed for execution in a virtualized computing environment 210. Each of the compliance characteristics 212 received by the receiver 222 are used to determine an extent or level of compliance of the software application 202 when deployed as is described in detail below. For example, compliance characteristics 212 can be defined in a Cloud Compliance Matrix (CCM) provided by the Cloud Security Alliance (CSA).

The selector 224 is a software or hardware component operable to select one or more software components as compliance software components 218 for assessing, measuring or determining an extent or level of compliance of the software application 202 when deployed.

The modifier 226 is a software or hardware component operable to modify a deployment specification 204 associated with the software application 202 to identify the selected compliance software components 218 such that, on deployment of the software application 202, the selected compliance software components 218 are operable to determine a level or extent of compliance of the software application 202 with the received compliance characteristics 212. For example, the modifier 226 can modify the deployment specification 204 by amending, supplementing or augmenting the deployment specification 204 such that the selected compliance software components 218 are instantiated at runtime of the deployed application 202.

Thus, in this way the compliance augmentation tool 220 is operable to modify the deployment specification 204 for the application 202 to incorporate compliance software components 218 selected by the selector 224 based on the received compliance characteristics 212. The deployed software application 202 in operation at runtime is thus augmented by the selected compliance software components 218 such that the compliance software components 218 function to retrieve, inter alia, data, metrics, configuration details, measurements, test results or any other information suitable for determining characteristics of the deployed software application 202. Such information on the characteristics of the application 202 are suitable for determining an extent or level of compliance of the application 202 with the received compliance characteristics 212. The inclusion of the compliance software components 218 as part of the deployment of the application 202 means that the extent or level of compliance can be continually determined irrespective of whether the software application 202 and/or the virtualized computing environment 210 is adapted, redeployed, adjusted or otherwise changed at runtime, such as in response to changes in the operation of the application 202 or in response to service based facilities such IaaS, PaaS, SaaS or Cloud Computing facilities. For example, changes to the workload of application 202 may result in a corresponding change to the provisioning of resources for the application by an infrastructure or platform service provider. Such changes can reflect a feature of services provided environments known as 'elasticity' involving the scaling up or down and/or transitioning of resources to accommodate changing needs of the application 202 or changing demands on the resources or services of the service providers. The deployment of the compliance software components with the application 202 allows for the determination of an extent or level of compliance even when such changes are effected to the application or virtualized computing environment 210.

Figure 3:
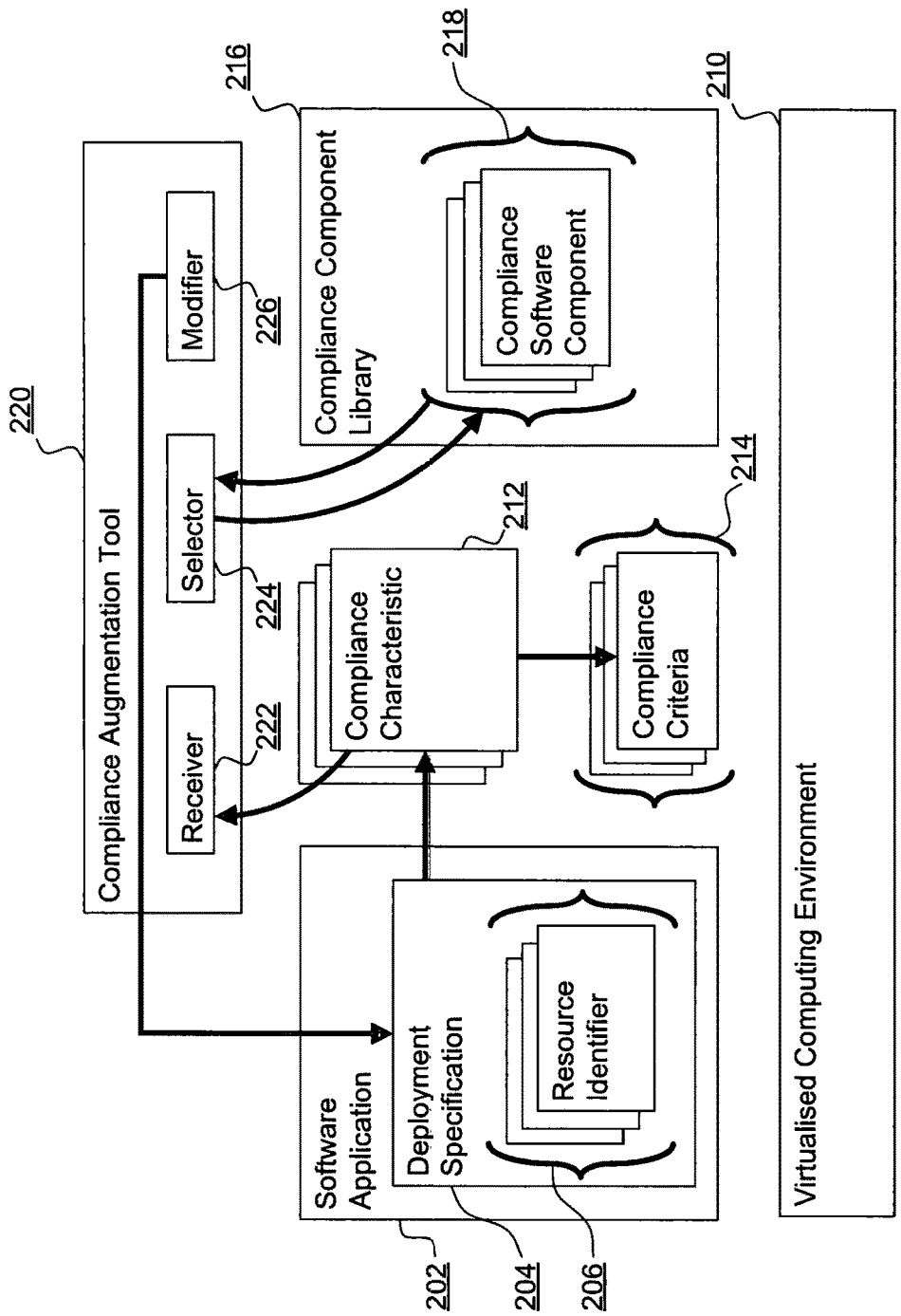
FIG. 3 is a detailed component diagram of the arrangement of FIG. 2 in accordance with an exemplary embodiment of the present invention.

FIG. 3 is a more detailed component diagram of the arrangement of FIG. 2 in accordance with an exemplary embodiment of the present invention. Many of the features of FIG. 3 are identical to those described above with respect to FIG. 2 and these will not be repeated here.

The virtualized computing environment 210 is an environment for the deployment of the software application 202. For example, the virtualized computing environment 210 can be provided as a particular operating system executing within a virtual machine with a hypervisor on a hardware device or, potentially, a distributed arrangement of hardware devices. The virtualized computing environment 210 can be provided as a service-based technology such that the environment 210 is delivered as a service for the installation and execution of a software application such as application 202. In a preferred embodiment, the virtualized environment is provided as part of a Cloud Computing service provided by a Cloud Computing service provider such as BT Cloud Compute available from British Telecommunications plc. Additionally or alternatively, the virtualized computing environment 210 can be provided as, or operate with, a service based infrastructure and/or platform such as IaaS and/or PaaS.

Deployment of the software application 202 includes any or all of installing, configuring, arranging and adapting the software application 202 such that the application 202 is executable with the virtualized computing environment 210. For example, a web based software application can be installed to execute with an operating system executing on a virtual machine, the virtual machine being configured to include networking facilities and the virtual machine also having installed thereon a web server having a certain configuration, a database and certain other requirements defined for the application. All such installation and configuration such that the web based software application is executable in the virtualized computing environment 210 is part of the deployment of the application.

The software application 202 has associated a deployment specification 204 suitable for use in deploying the software application 202 with the virtualized computing environment 210. For example, the deployment specification 204 can include a specification of an architecture of the software application 202 and/or an architecture of software components required for the application 202. Additionally or alternatively, the deployment specification 204 can include specifiers or descriptors of application or other software or platform components that are required for the deployment of the application 202.

In some embodiments the virtualized computing environment 210 is provided as, or operates with, a service based infrastructure and/or platform such a Cloud Computing service, an IaaS service and/or a PaaS service. In such embodiments the deployment specification 204 is further suitable for use in deploying the software application 202 with such services. The deployment specification 204 identifies one or more resources required for the deployment of the application 202 such that the application executes with the virtualized computing environment 210. Resources can include functions, dataflows and/or technologies. Examples of function resources include bespoke functions, procedures, modules or components provided for the software application 202, such as a library containing functions embodying or supporting the application 202 or a class of instantiable objects providing methods and routines of or for the application 202. Examples of dataflow resources include communications between software components such as the invocation of a function, routine or method of a first component by a facility of a second component. A further example of a dataflow resource is a coupling between two or more components such that messages are passed, requests are sent or data is shared between the two components. Such components can be internal to the application 202 when deployed, part of the virtualized computing environment 210 or external to the application and the virtualized computing environment 210. Examples of technology resources include particular software components, applications or facilities to be installed to deploy the application 202. For example, a technology resource can be a database software component from a particular technology vendor at a particular version, release or level. Further examples of technology resources include intrusion detection or prevention technologies, virus scanning technologies such as antivirus software, web servers, operating systems, middleware and message handling technologies.

Thus, resources can include, inter alia, software or hardware components, software packages, modules, applications, services or solutions, networking facilities, protocols, storage facilities including databases, middleware facilities, user interface facilities and connectivity services. The deployment specification 204 may explicitly identify resources such as an explicit identification of a particular database or web server facility. Alternatively or additionally, the deployment specification 204 can be suitable for identifying a resource such that the identification is not explicit but is discernable. For example, an explicit identification of a web server resource by the software application further identifies dataflows between web page repositories, server side script repositories and the web server. Such dataflows are identified by the deployment specification 204 while such identification is not necessarily explicit. In all cases the deployment specification identifies resources as is illustrated schematically in FIG. 3 as a set of resource identifiers 206.

In identifying resources for the deployment of the software application 202, the deployment specification 204 can include an architecture specification as a specification of an environment such as the virtualized computing environment 210, potentially including a definition of an architecture of technology components such as software components, software packages, applications, services or solutions required for the deployment of the application. For example, the deployment specification 204 can be at least partly embodied as an architecture, environment, platform, topology or software stack specification. Such specifications can be expressed in formal terms such as through formal specification languages, semantic definitions, models or diagrams. For example, an architecture of the virtualized computing environment 210 can be expressed as a unified modelling language (UML) movel such as a physical UML model, a deployment model or a component model such as are described in "UML Distilled—A Brief Guide to the Standard Object Modelling Language" (Martin Fowler and Kendall Scott, 2000). Further, an architecture of the virtualized computing environment 210 can be built using a formal modelling tool such as the tools in the IBM Rational suite of products (IBM and Rational are trademarks or registered trademarks of IBM Corp. in some countries.) The architecture of the virtualized computing environment 210 is expressed in a parseable or machine readable manner such as within a standard document format, data structure, specification language, modelling language or markup language.

For example, a configuration of the virtualized computing environment 210 can be partly or completely expressed in configuration specifications such as XML files. An example of an XML specification of a virtual machine component of a virtualized computing environment 210 is a domain specification parsed by the 'libvirt' tool. The domain specification is a virtual machine specification stored in an XML file which, when processed by the libvirt tool, can be used to create a new virtual machine in a virtualized computing environment 210. The libvirt domain specification can include, inter alia, the specification of: a hypervisor; an operating system; a boot mechanism such as BIOS bootloader; CPU allocation; CPU tuning; memory allocation; CPU topology; power management; clock and time configuration; input/output device configuration; storage device configuration; filesystem configuration; device busses and controllers; network interfaces; input devices; graphic framebuffers; video devices; consoles; and other physical or software characteristics of a virtualized computing environment 210. Thus a libvirt domain specification can comprise at least part of the deployment specification 204 for an application.

Additionally or alternatively, in identifying resources for the deployment of the software application 202 the deployment specification 204 can include a specification or description of the application 202 and how the application should be deployed, such as by identifying constituent parts of the application and defining installation and configuration details. For example, the paper "Solution Deployment Descriptor 3 Specification 1.0" (Organization for the Advancement of Structured Information Standards (OASIS), 2008) describes a standard for a set of XML documents that define deployment metadata about deployment artifacts and the aggregation of deployment artifacts. The solution deployment descriptor (SDD) provides a standard way to encode deployment information. Such XML documents containing SDD information can be parsed to identify resources associated with the deployment specification. Deployment artifacts are package contents that can be processed to create or modify software resources in the deployment environment. These resources collectively make up the software whose deployment is described by the SDD and include items such as executable files and database table definitions. Examples of deployment artifacts are Linux RPM files, Microsoft MSI files, setup.exe, ZIP, and custom installation executable files (see "Solution Deployment Descriptor (SDD), Part 1: An emerging standard for deployment artifacts", McCarthy & Miller, 2008). Thus the SDD is suitable for identifying resources required for the deployment of an application 202 to a virtualized computing environment 210: Such resources can include applications, software components or technologies installed or deployed for the operation of the software application 202, such as database software, middleware, message handling software, security software, intrusion detection or prevention software etc.

Further techniques suitable for the identification of resources for the deployment of software application 202 include, inter alia: functional decomposition; data model definitions; data schema definitions; library linkages; class and/or object models; component introspection such as object introspection; code analysis such as source code analysis; software component models; component interaction models; and data structures such as those identified by, or available from, integrated software development environments. Such techniques can be employed to identify functional and data components within the application 202. For example, application source and/or packaging code including package information, library linkages such as static or dynamic linkages, build scripts, install scripts or similar, can be used to identify resources. Functional components within the application 202 and resources employed by, linked to, or otherwise associated with, the software application 202 such as resources in the virtualized computing environment 210, software components installed with or for the software application 202 or software components constituting the platform, PaaS, IaaS or other aspects of the architecture of the application 202 or environment 210 can be identified. Further, by reference to data schemas, application and library linkages, build and packaging scripts it is possible to identify dataflow resources. All such insights obtainable about the software application and the virtualized computing environment and being suitable for identifying, directly or indirectly, resources for the software application, constitute part of the deployment specification 204.

It will be apparent to those skilled in the art that, while the deployment specification 204 is illustrated in FIG. 2 as being comprised within the software application 202, the deployment specification 204 need not be so integrated and alternatively the deployment descriptor can be associated with the software application 202 or generated for the software application 202. Equally, the deployment specification 204 can exist independent of the software application 202 such that the deployment specification 204 specifies how technologies, software, hardware etc. are to be deployed in order to constitute the software application 202.

One or more of the resources identified by the deployment specification 204 are resources about which compliance characteristics 212 of the software application 202 can be assessed on deployment of the software application 202. Which of the compliance characteristics 212 is relevant to the software application 202 is determined based on the resources identified by the deployment specification 204 as is described in detail below with respect to FIG. 5. As a characteristic of the software application 202 when deployed, each of the relevant compliance characteristics 212 can relate to characteristics of the software application 202 itself and/or characteristics of the virtualized computing environment 210 with which the software application 202 executes. Yet further, relevant compliance characteristics 212 can relate to characteristics of software, hardware, functions, features or services employed in deploying the software application 202 such as software installed with the virtualized computing environment 210, and/or software, hardware, functions, features or services external to both the software application 202 and the virtualized computing environment 210, such as software components providing services or functions to the software application 202 or the virtualized computing environment 210. Thus, the compliance characteristic 212 can include characteristics of the application 202, the virtualized computing environment 210, any environment for the deployment of the application 202 such as a Cloud Computing service, an IaaS service, a PaaS service, or a service or function provided external to any virtualized, Cloud, IaaS or PaaS service but operating in conjunction with such service.

Examples of characteristics of software applications include, inter alia: features, facilities, attributes and services of an application such as: resources used; algorithms employed; protocols supported; versions of features, algorithms, services or protocols supported or used; performance characteristics such as speed, overhead or throughput; a level or standard of security; adherence to one or more defined standards; update or refresh intervals used; level of up-to-datedness of features, facilities, attributes or services; environments, systems, protocols or functions used; particular versions or levels of environments, systems protocols or functions used; hardware or software supported; audit facilities available; data governance technology or services employed; user access controls employed; hardware requirements; languages used; encryption standards used; patch management processes employed; intrusion detection or prevention facilities available; virus-detection, protection and prevention facilities available; financial handling facilities available; diagnostic tools employed; diagnostic services available; legal or regulatory requirements adhered to; policies employed; third-party access controls in place; reliability facilities provided; accessibility features available; stability features employed; database used; database facilities supported; geographic location of hardware or software; particular geographic distribution, or non-distribution, of hardware or software; features of physical equipment security; networks supported; data integrity facilities used or measures available; and any other characteristic conceivably attributable to a software application as will be apparent to those skilled in the art.

Each of the compliance characteristics 212 is defined by a set of compliance criteria 214. The set of compliance criteria 214 for a compliance characteristic 212 is used to determine an extent or level of compliance of the deployed software application 202 with the compliance characteristic 212. Each criterion in the set of compliance criteria 214 concerns a resource identified by the deployment specification 204. For example, a compliance criterion may explicitly relate to a resource identified by one of the resource identifiers in the set of resource identifiers 206. Alternatively or additionally, a compliance criterion can concern a feature, attribute, characteristic or component associated with a resource. For example, a criterion may relate to, inter alia, a provider of a resource, a counterpart to a resource, a configuration of a resource or a function of the resource.

Where multiple compliance criteria 214 define a compliance characteristic 212 then satisfaction of all the compliance criteria 214 is normally required for the deployed software application 202 to be fully compliant. Satisfaction of anything less than all the criteria 214 will normally constitutes non-compliance. In some embodiments a single criterion in the set of compliance criteria 214 is sufficient to define a compliance characteristic. Further, in some embodiments, a more complex set of compliance criteria 214 may be conceived such that satisfaction of a subset of the compliance criteria 214 by a deployed software application 202 is determined to be sufficient to constitute full compliance with the compliance characteristic 212. For example, multiple alternative compliance criteria 214 may be provided, any or all of which are satisfactory alternatives to each other. Yet further, in an alternative embodiment the set of compliance criteria 214 may be comprised of a plurality of subsets of compliance criteria, any or all of which being sufficient to constitute compliance with the compliance characteristic 212. Thus, an extent to which a deployed software application 202 satisfies compliance criteria 214 in the set of compliance criteria is suitable for determining a level of compliance of the software application 202 with the compliance characteristic 212 when the application 202 is deployed. One way to measure a level of compliance for the deployed software application 202 is to evaluate a proportion of all the compliance criteria 214 in the set of compliance criteria 214 that are satisfied and use such proportion as a quantitative measure of a level or extent of compliance. In some embodiments different compliance criteria 214 can have different weights associated such that an evaluation of a quantitative level of compliance includes applying weights, such as multiplicative factors, to certain of the compliance criteria 214 when determining a proportion of all the compliance criteria 214 that are satisfied. In this way it is possible to impart a greater emphasis on certain of the compliance criteria 214 in the set.

The compliance software components 218 belong to a set stored in a compliance component library 216. The library 216 can be a data store, database, single or multiple static or dynamic software libraries, repository, software object library or any other suitable mechanism for storing the compliance software components 218 as will apparent to those skilled in the art. Each compliance software component 218 is selectable for one or more compliance characteristics 212 such that a compliance software component 218 is operable to contribute to an assessment of an extent or level of compliance of one or more compliance characteristics 212. Thus, in preferred embodiments, the compliance software components 218 are operable to assess the satisfaction of the one or more compliance criteria 214 associated with one or more compliance characteristics 212.

The compliance software components 218 can be embodied as, inter alia, software routines, agents, modules, functions, methods or objects for determining an extent or level of compliance of the software application 202 with the received compliance characteristics 212. The level of compliance of the software application 202 is assessed, determined or measured when the application 202 is deployed and can include a level of compliance of the application 202 itself by virtue of the functions, operations, behaviors, data items and communications of the software application 202 and additionally the compliance of the execution environment in which the application 202 operates including, inter alia, the virtualized computing environment 210 and any additional internal or external facilities, services or components with which the application 202 operates.

In an exemplary embodiment, each of the compliance software components 218 is a functional component for executing with the deployed application 202. In some embodiments a software component 218 can be embodied as a configuration change to the software application 202, such as a selection of a mode of operation of a component of the software application 202. For example, a compliance software component 218 can be embodied as a change of a mode of operation of a function of the application 202 such that the function operates to generate trace output, such as debug or verbose status information. Such a compliance software component 218, possibly in conjunction with other compliance software components 218 or other functionality, can cause the generation of additional data that can be used to determine an extent or level of compliance with a compliance characteristic 212. Further, in some embodiments, a compliance software component 218 can be operable to prepare and/or send messages or invoke functions or engage application programming interfaces (APIs) of components comprised in the application 202, the environment 210 or other components, features or services executing with the application 202. In some embodiments a compliance software component 218 can be operable to test or challenge a feature or service of the application 202, environment 210 or other components. Further examples of the operation of compliance software components 218 include, inter alia, components that analyse, check, inspect, evaluate, scrutinise, probe or review features or services of the application 202, environment 210 or other components.

In a preferred embodiment, the virtualized computing environment 210 provides interfaces such as application programming interfaces (APIs) accessible to compliance software components 218. The compliance software components 218 can use such interfaces to, inter alia: collect data; request information; retrieve or set configuration; activate or deactivate functionality; and other features and functionality provided by the interface. Such information and functions provided by the interface are suitable for the compliance software component 218 to contribute to an assessment of an extent or level of compliance of the software application 202 operating with the virtualized computing environment 210.

Further, in a preferred embodiment, resources external to both the application 202 and the virtualized computing environment 210 can provides interfaces such as application programming interfaces (APIs) accessible to compliance software components 218. Such components can include, inter alia: third party services or functions; supplementary facilities; external routines; collaborating applications; or other external resources. The compliance software components 218 can use such interfaces in a manner similar to the use of interfaces of the virtualized computing environment 210 described above.

While the receiver 222, selector 224 and modifier 226 are illustrated as being comprised within the compliance augmentation tool 220, it will be appreciated by those skilled in the art that these components may be provided external to the compliance augmentation tool 220 such as in association with, in communication with or otherwise operable with the compliance augmentation tool 220.

Figure 4:
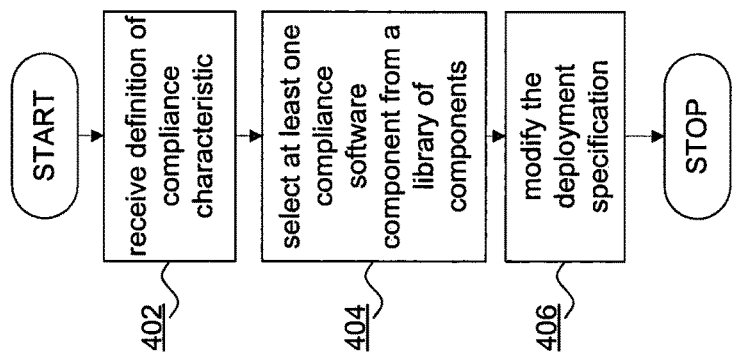
FIG. 4 is a flowchart of a method of the compliance augmentation tool of FIGS. 2 and 3 in accordance with an exemplary embodiment of the present invention.

FIG. 4 is a flowchart of a method of the compliance augmentation tool 220 of FIGS. 2 and 3 in accordance with an exemplary embodiment of the present invention. The method augments a deployment specification 204 of a software application 202 such that an extent or level of compliance of the application 202 with a compliance characteristic 212 can be determined when the application 202 is deployed. Initially, at step 402, a definition of the compliance characteristic 212 is received including a set of one or more compliance criteria 214. The satisfaction of the compliance criteria 214 for the compliance characteristic 212 is suitable for determining a level of compliance of an application 202 with the compliance characteristic when the application is deployed. At step 404 at least one compliance software component 218 is selected from a compliance component library 216. The selection is based on the definition of the compliance characteristic 212 as will be described in detail below with respect to FIG. 5. The compliance software component 218 is operable to determine a state of satisfaction of at least a subset of the set of compliance criteria 214 for the compliance characteristic 212. At step 406 the deployment specification 204 for the application 202 is modified to identify the selected compliance software components 218 such that, on deployment of the application 202, the application 202 is operable to determine a level of compliance of the application 202 with the compliance characteristic 212.

Figure 5:
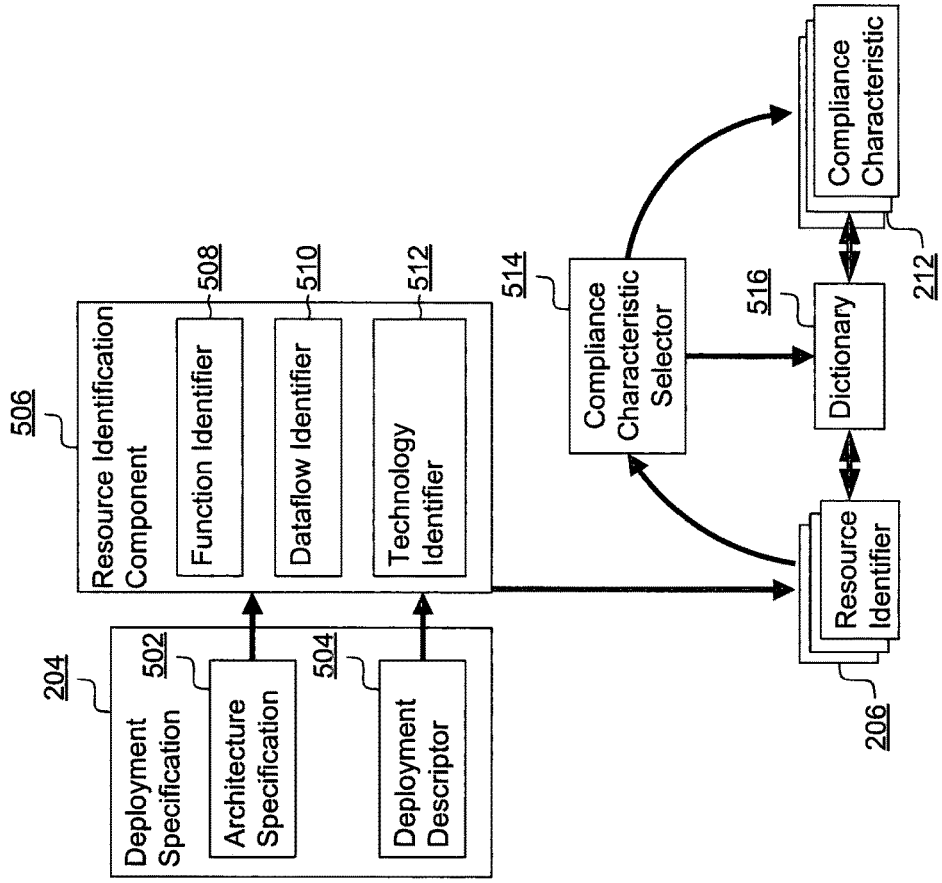
FIG. 5 is a component diagram illustrating resource identification and compliance characteristic selection processes in accordance with an exemplary embodiment of the present invention.

FIG. 5 is a component diagram illustrating resource identification and compliance characteristic selection processes in accordance with an exemplary embodiment of the present invention. Many of the features of FIG. 5 are identical to those described above with respect to FIGS. 2 to 4 and these will not be repeated here. The deployment specification 204 for the software application 202 identifies resources required for the deployment of the application. In the embodiment of FIG. 5 the resources are identified using an architecture specification 502 and a deployment descriptor 504. A resource identification component 506 is a software or hardware component for establishing resource identifiers 206 based on the deployment specification 204. The resource identification component 506 can be an integral part of the compliance augmentation tool 220 or, alternatively, the resource identification component 506 can be at least partly external to, and operable or associated with, the compliance augmentation tool 220. In the exemplary embodiment the resource identification component 506 includes three further software or hardware components: a function identifier 508; a dataflow identifier 510; and a technology identifier 512. The function identifier 508 is operable to identify function resources required for the deployment of the software application 202, such as function resources previously described. The dataflow identifier 510 is operable to identify dataflow resources required for the deployment of the software application 202, such as dataflow resources previously described. The technology identifier 512 is operable to identify technology resources required for the deployment of the software application 202, such as technology resources previously described. The function identifier 508, dataflow identifier 510 and technology identifier 512 are operable to identify resources 206 based on the architecture specification 502 and the deployment descriptor 504. It will be appreciated that while the resource identification component 506 is illustrated as including the function identifier 508, dataflow identifier 510 and the technology identifier 512, a subset of these components or one or more alternative components suitable for identifying at least a subset of resources required to deploy the software application 202 could alternatively be employed.

In an exemplary embodiment, the resource identifiers 206 of the resources required to deploy the software application 202 are used to identify a set of compliance characteristics 212 for the application 202. A compliance characteristic selector 514 is a software or hardware component for selecting one or more compliance characteristics 212 from a dictionary 516 of compliance characteristics. The selected compliance characteristics 212 are those compliance characteristics 212 with which an extent or level of compliance of the deployed application 202 is measured or assessed. The compliance characteristic selector 514 can be an integral part of the compliance augmentation tool 220 or, alternatively, the compliance characteristic selector 514 can be at least partly external to, and operable or associated with, the compliance augmentation tool 220.

In an exemplary embodiment the dictionary 516 is a repository of references to compliance characteristics, some or all of which can be selected by the compliance characteristic selector 514 for applicability to the application 202. The compliance characteristic selector 514 can include rules for determining which compliance characteristics should be selected from the dictionary 516. In an exemplary embodiment the dictionary 516 provides a mapping between resources and compliance characteristics such that the compliance characteristics 212 can be selected based on the identified resources 206. For example, the dictionary 516 can be a correspondence table relating resources to compliance characteristics. Identified resources 206 can be associated with attributes such as: a resource type; a resource name; a resource version etc. The dictionary 516 can provide a correspondence, mapping, association or other identification of one or more compliance characteristics 212 for certain attributes of a resource. For example, resources of the type "database" can be associated with compliance characteristics 212 relating to database characteristics. Thus, in use, the compliance characteristic selector 514 selects compliance characteristics 212 for receipt by the receiver 222 of the compliance augmentation tool 220. In this way the compliance characteristics 212 with which an extent or level of compliance of the deployed software application 202 is measured can be determined based on the deployment specification 204 for the software application 202.

Some compliance characteristics in the dictionary 516 may be designated as mandatory or broadly applicable such that the compliance characteristics are used for all applications irrespective of the identified resources 206. Further, compliance characteristics 212 can be identified for the software application 202 based on specific operational requirements determined for the application 202. In some embodiments, a set of compliance characteristics 212 can be defined to reflect operational standards required for the deployed application 202 and/or relevant compliance characteristics 212 can be identified in dependence on the particular constitution and/or configuration of the deployed software application 202 as reflected by the identified resources 206. For example, a software application dealing with personal confidential information may be required to comply with legal and regulatory requirements reflected by one or more compliance characteristics. Accordingly, where an assessment of the identified resources 206 indicates that such information is handled by the application, compliance characteristics relating to such regulatory requirements can be selected by the compliance characteristic selector 514.

Figure 6:
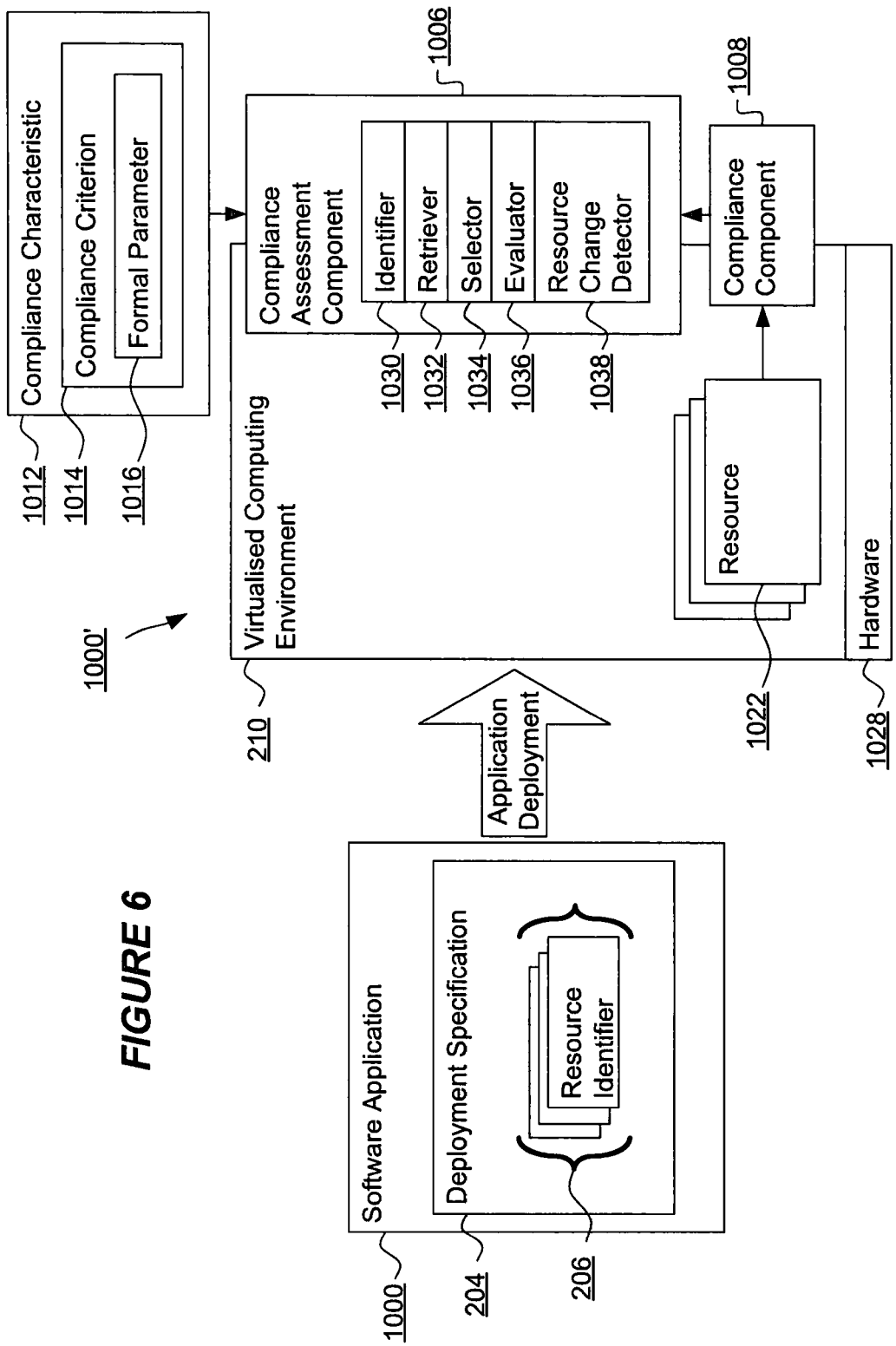
FIG. 6 is a component diagram illustrating a deployment of a software application with a virtualized computing environment in accordance with an exemplary embodiment of the present invention.

FIG. 6 is a component diagram illustrating a deployment of a software application 1000 with a virtualized computing environment 210 in accordance with an exemplary embodiment of the present invention. The software application 1000 of FIG. 6 includes a deployment specification 204 identifying resources 206 required for deployment of the application 1000 to the virtualized computing environment 210.

The deployed software application 1000' includes one or more resources 1022 operating with the virtualized computing environment 210. The deployed application 1000' has associated a compliance assessment component 1006. The compliance assessment component 1006 is a software or hardware component operable to determine a level of compliance of the deployed application 1000' based on at least a compliance criterion 1014 and a compliance software component 1008. The compliance assessment component 1006 is executed, instantiated or otherwise deployed in conjunction with the deployed application 1000'. One way to deploy the compliance assessment component 1006 is to include an identifier of the component 1006 with the deployment specification 204 so as to cause the deployment of the compliance assessment component 1006 along with the application 1000. Alternatively the compliance assessment component 1006 can be predefined, predeployed, preinstalled or configurably installed, such as in association with a component of the virtualized computing environment 210 such as a hypervisor 1026 or operating system.

The compliance assessment component 1006 includes: an identifier 1030; a retriever 1032; a selector 1034; an evaluator 1036; and a resource change detector 1038. The identifier 1030 is a software or hardware component operable to identify resources 1022 instantiated for execution of the deployed application 1000'. For example, the identifier 1030 may receive the deployment specification 204 indicating the resources instantiated for the application 1000. Alternatively or additionally the identifier 1030 can monitor the deployed application 1000', the virtualized computing environment 210 or the resources 1022 themselves to identify the resources 1022. In one embodiment, the identifier 1030 receives an indication of the resources deployed for the application 1000' from a component associated with the virtualized computing environment 210 such as a hypervisor component. In an alternative embodiment, the identifier 1030 interfaces with a component of the virtualized computing environment 210 to identify the resources 1022 via in interface such as an API.

The retriever 1032 is a software or hardware component for retrieving a compliance characteristic 1012 for the deployed application 1000'. The retrieval of the compliance characteristic 1012 is based on the resources 1022 identified by the identifier 1030. In one embodiment, the retrieval of the compliance characteristic 1012 is pre-specified or pre-determined on or before deployment of the application 1000'. For example, the compliance characteristic 1012 can be specified in a configuration of the deployed application 1000'. In an alternative embodiment the compliance characteristic 1012 is retrieved by the retriever 1032 using a compliance characteristic selector 512, 814 such as is described with respect to FIG. 5.

The compliance characteristic 1012 has associated a compliance criterion 1014 being based on a formal parameter 1016. The formal parameter 1016 is a parameter required for an evaluation of the compliance criterion 1014. A data item, argument, or variable supplied to evaluate the compliance criterion 1014, such data item constituting the formal parameter 1016, is known as an actual parameter. A single compliance characteristic 1012 is illustrated in FIG. 6, the compliance characteristic 1012 having a single compliance criterion 1014 with a single formal parameter 1016. This representation is chosen for simplicity though it will be appreciated that alternative embodiments can include any number of similar or disparate compliance characteristics each having potentially numerous compliance criteria, each criterion being based on potentially numerous formal parameters. Further, each criterion can specify dependencies between formal parameters. All such compliance characteristics 1012 are retrievable by the retriever 1032.

The selector 1034 is a software or hardware component for selecting a compliance software component 1008 for providing an actual parameter corresponding to the formal parameter 1016. The actual parameter can include or be based on, inter alia: data relating to, about or from one or more resources 1022; data concerning a state of one or more resources 1022; data indicating an occurrence of an event associated with one or more resources 1022; data including a measurement of a characteristic of one or more resources; or a transformation of data associated with one or more resources 1022. The compliance component 1008 contributes to a determination of a level or extent of compliance of the software application 1000 with a compliance characteristic 1012 by providing the actual parameter. The compliance component 1008 is executed, instantiated or otherwise deployed in conjunction with the deployed application 1000'. One way to deploy the compliance component 1008 is to include an identifier of the component 1008 with the deployment specification 204 so as to cause the deployment of the compliance component 1008 along with the application 1000. Thus, in one embodiment, the deployment specification 204 is augmented by the inclusion of a compliance software component identifier, such as in accordance with one of the methods described hereinbefore with respect to FIGS. 2 to 5. The inclusion of a compliance software component identifier in the deployment specification 204 is such that, on deployment of the software application 1000, compliance software component 1008 is deployed. Alternatively the compliance component 1008 can be predefined, predeployed, preinstalled or configurably installed, such as in association with a component of the virtualized computing environment 210 such as a hypervisor or operating system.

Preferably the compliance component 1008 is one of a set of compliance components executable or executing in association with the virtualized computing environment 210. The selector 1034 is arranged so as to select a compliance component 1008 such that the compliance component 1008 is operable to provide an actual parameter for the compliance criterion 1014. Thus the selector 1034 is operable to select a compliance component 1008 that is operable to access, obtain, retrieve or receive such data on which the actual parameter is based.

Notably, it is not a prerequisite for instantiation of the compliance component 1008 that the component is identified in the deployment specification 204. Rather, the compliance component 1008 can be deployed by default, by design, as a consequence of the deployment of a resource identified for the application 1000 or otherwise automatically. In one embodiment, the compliance assessment component 1006 is deployed along with the application 1000 and the compliance assessment component 1006 is operable to cause the deployment of the compliance component 1008.

Most preferably the compliance assessment component 1006 and the compliance software component 1008 execute with the deployed application 1000' in a trusted mode of operation such that the compliance assessment component 1006 and the compliance software component 1008 have trusted access to aspects of the deployed application 1000'. Such aspects can include: configuration information; interfaces; technologies; configuration information and data flows. Examples of interfaces include logical or software interfaces such as APIs of any or all of the resources 1022 instantiated for the deployed application 1000' or any other component operable with, or as part of, the deployed application 1000'. Examples of technologies include technical components such as software components provided by software suppliers or service providers and providing functions or services such that the compliance component 1008 can request or retrieve information or functions of the components. Examples include components, or providers of components, for intrusion prevention, virus detection, middleware or databases. Typically such technologies are uniquely identifiable such as by a version of the technology.

Compliance software component 1008 enjoys a sufficient level of trust that it is able to retrieve, obtain, receive or access information or functionality of resources in order to provide the actual parameter. Thus, where the compliance characteristic 1012 relates only to a single resource required for the deployment of the application 1000, then trusted access to the single resource may be sufficient. However, it will be apparent to those skilled in the art that trusted access to resources other than a resource to which the compliance characteristic 1012 explicitly relates may be required to provide the actual parameter.

The evaluator 1036 is a software or hardware component operable to evaluate the compliance criterion 1014 using the actual parameter supplied by the compliance component 1008. Such evaluation is suitable for contributing to a determination of a level or extent of compliance of the deployed application 1000' with the compliance characteristic 1012.

The resource change detector 1038 is a software or hardware component operable to detect a change to the resources 1022 instantiated for the deployed application 1000'. Changes to resources can arise numerously including, inter alia: changes to the configuration of a resource by another resource, component or an operator; changes to the configuration of the virtualized computing environment 210; upgrades to a resource; failure of a resource; addition of a new resource; changes to the software application 1000; redeployment of the software application 1000; and reprovisioning of a service based environment provided for the deployed application 1000'. Such reprovisioning is common with cloud computing services, IaaS, PaaS and SaaS environments and can arise in response to a change in the resource requirements of the deployed application 1000' at runtime. For example, the resource demands of the deployed application 1000' can vary based on usage of the application 1000' or throughput of the application 1000'. For example, software applications providing web-based services receiving and reacting to requests received over a network can see a rate of receipt of requests fluctuate over time. Accordingly, a cloud computing service provider may change the resource provisions allocated to such an application in response to fluctuations of resource requirements resulting from such fluctuations in requests. This contributes to the elasticity of such service based environments. The resource change detector can detect changes to the resource instantiated for the application 1000' in numerous ways including, inter alia: the obtaining and monitoring of profiles of resources such as process monitoring; hardware resource monitoring; resource consumption; and configuration settings monitoring. Further, changes to resources can be flagged by the virtualized computing environment 210 or other service based environment such as via an indicator, notification, message or otherwise to indicate a resource change. In one embodiment, the resource change detector 1038 is operable in conjunction with the identifier 1030 to identify a change in resources 1022 instantiated for the deployed application 1000'.

A single compliance component 1008 is illustrated in FIG. 6 for simplicity. It will be appreciated that alternative embodiments can employ multiple and potentially disparate compliance components. Multiple compliance components can be employed such that compliance component 1008 or compliance assessment component 1006 further select other compliance components to obtain information required to supply the actual parameters. Thus, compliance components can be organized in a network, hierarchy, or other suitable arrangement such that information required to evaluate the compliance criterion 1014 can be obtained.

While the identifier 1030, retriever 1032, selector 1034, evaluator 1036 and resource change detector 1038 are illustrated as being comprised with the compliance assessment component 1006 it will be apparent to those skilled in the art that any or all of these components could be alternatively provided as a separate component, or part of a separate component, external to and operable in association with the compliance assessment component 1006. Further, while the compliance assessment component 1006 is illustrated as being partly comprised within the virtualized computing environment 210 it will be appreciated by those skilled in the art that the compliance assessment component 1006 could equally be implemented entirely within the virtualized computing environment 210; or alternatively the compliance assessment component 1006 could be implemented external to the virtualized computing environment 210 and associated with the deployed application 1000' such as being operable in communication with the deployed application 1000' via software components, a software interface, a network or any suitable communication means.

Figure 7:
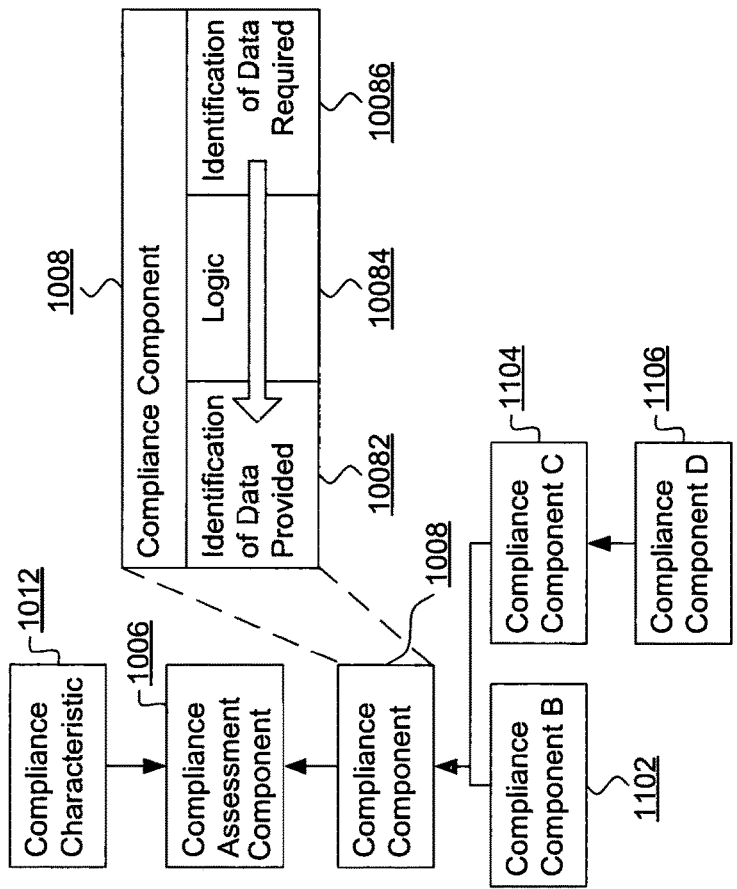
FIG. 7 is a component diagram of a plurality of compliance components in accordance with an exemplary embodiment of the present invention.

FIG. 7 is a component diagram of a plurality of compliance components in accordance with an exemplary embodiment of the present invention. In the arrangement of FIG. 7 compliance component 1008 selects further compliance components 1102 and 1104. Compliance component 1104 further selects compliance component 1106. The additional compliance components 1102 to 1106 can be instantiated as a result of augmentation of the deployment descriptor 204 for the application 1000. Alternatively, the compliance component 1102 to 1106 can be instantiated dynamically at runtime, automatically in association with any of the resources of the deployed application 1000', or in response to instantiation requests by the compliance assessment component 1006 or other instantiated compliance components. The compliance component 1008 of FIG. 7 selects compliance components 1102 and 1104 to provide data to it, each supplying data constituting at least some of the data required to provide an actual parameter corresponding to the formal parameter 1016. Alternatively, compliance components 1102 and 1104 could be selected by the compliance assessment component 1006. An exploded view of an exemplary embodiment of compliance component 1008 is also illustrated in FIG. 7. The compliance component 1008 includes: an identification 10082 of data provided by the compliance component 1008; an identification 10086 of data required by the compliance component 1008; and logic 10084 of the compliance component 1008. The identification 10082 of data provided by the compliance component 1008 is an identification of data that the compliance component 1008 can provide as an output, such as an output to another compliance component or to the compliance assessment component 1006. The identification 10082 can be, inter alia, an advertisement, a publication, a statement or a configuration setting indicating what type, class or category of data the compliance component 1008 is operable to provide. The indication 10086 of data required by the compliance component 1008 is an identification of data that the compliance component 1008 requires in order to generate the data provided by the compliance component 1008. The required data can be obtained from other compliance components, such as components 1102 and 1104 in FIG. 7. Thus identification 10086 identifies prerequisite data for the compliance component 1008. Logic 10084 can include functionality and operations performed by the compliance component 1008 including, inter alia: accessing, retrieving or receiving data from resources of the deployed application 1000'; interface operations for cooperating with resources over an API; measurement logic for measuring characteristics of resources; modification or transformation logic to modify or transform data; logic to combine, fuse or integrate data or information; and logic suitable for identifying patterns, themes or characteristics from data or information. Such data or information can include data received from a resource, data received from another compliance component or data resulting from a measurement operation.

This arrangement of the compliance component 1008 is replicated across all compliance components to provide for the interoperation and cooperation of components in obtaining actual parameters required to evaluate the compliance criterion 1014. The selection of the compliance component 1008 by the compliance assessment component 1006 is based on the formal parameter 1016 such that the compliance component 1008 includes an identification 10082 of data it provides that is suitable for constituting an actual parameter corresponding to the formal parameter 1016.

In the exemplary embodiment, the identifications 10082 and 10086 for the compliance component 1008 and the formal parameter 1016 are specified using a common format and/or namespace such that data provided by and required by compliance components can be compared with the formal parameter 1016. In this way it is possible for the compliance assessment component 1006 to select one or more appropriate compliance components to provide data required to evaluate the compliance criterion 1014. Further, it is possible for each compliance component to select further compliance components to provide any required prerequisite data. The common format and/or namespace can be organized in a hierarchy or network such that prerequisite data requirements can be discerned from the namespace.

While the compliance software components 1102 to 1106 are described as software components it will be appreciated by those skilled in the art that any or all of compliance component 1102 to 1106 could be implemented in software, hardware, firmware or combinations of any of software, hardware and firmware. For example, each of the compliance software components 1102 to 1106 can be implemented as a hardware component such as an evaluator component operable to perform the function of a compliance software component.

Figure 8:
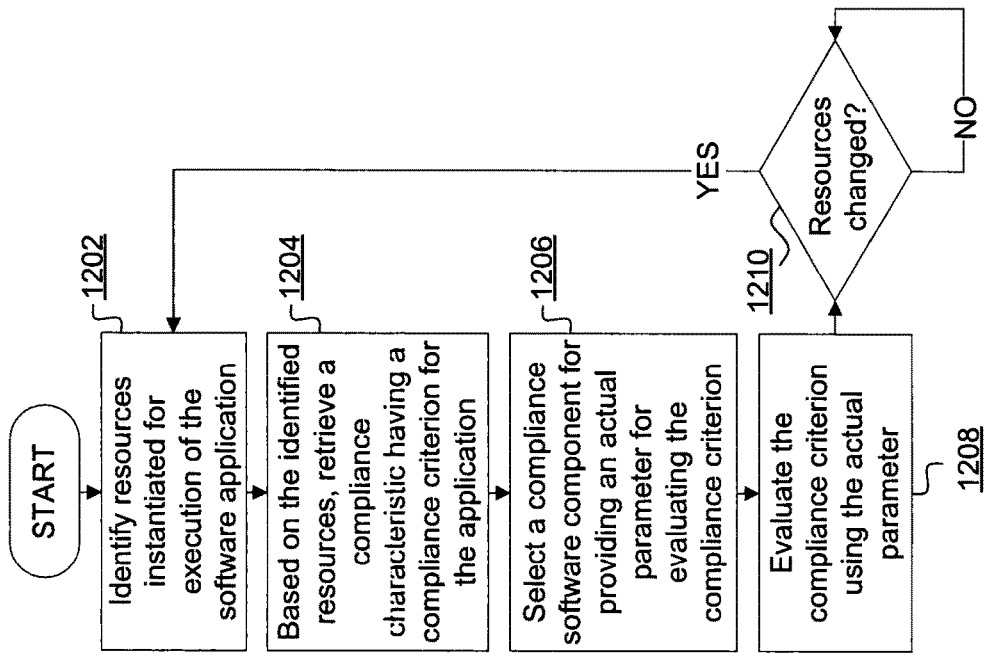
FIG. 8 is a flowchart of a method of the compliance assessment component of FIG. 6 in accordance with an exemplary embodiment of the present invention.

FIG. 8 is a flowchart of a method of the compliance assessment component 1006 in accordance with an exemplary embodiment of the present invention. At step 1202 the identifier 1030 identifies resources 1022 instantiated for execution of the application 1000'. Such an identification of resources 1022 can be determined based on, inter alia: configuration information for the virtualized computing environment 210; processes and services executing in the virtualized computing environment 210 identified using a process monitoring tool, a process and/or service registry and the like; referring to software components operable to interrogate resources for the application 1000'; accessing resource information via an API of one or more resources 1022; and other techniques as will be apparent to those skilled in the art. At step 1204 the retriever 1032 retrieves a compliance characteristic 1012 for the application. The retrieval 1204 is based on the resources identified at step 1202. Compliance characteristics can be associated with resources 1022 such as by to way of a compliance characteristic dictionary 516 as is illustrated in FIG. 5. Alternatively, associations between resources and compliance characteristics can be more complex such as: rule-based associations depending on multiple resources; associations based on attributes or characteristics of resources such as configurations, settings and or arrangements of resources; associations based on versions of resources; and other associations as will be apparent to those skilled in the art. The retrieved compliance characteristic 1012 has associated the compliance criterion 1014 based on the formal parameter 1016. Subsequently, at step 1206, the selector 1034 selects a compliance software component 1008 to provide an actual parameter corresponding to the formal parameter 1016. The actual parameter is based on data concerning at least one of the resources 1022 such that the compliance criterion 1014 can be evaluated. The selection of the compliance component 1008 is based on an identification, by the compliance component 1008, of one or more data items 10082 that the compliance component 1008 is operable to provide. At step 1208 the evaluator 1036 evaluates the compliance criterion 1014 using the actual parameter. The evaluation contributes to a determination of a level of compliance of the deployed application 1000'. At step 1210 the resource change detector 1038 determines if one or more resources 1022 instantiated for the software application 1000' is changed. Where a resource 1022 is changed, the method returns to step 1202 to repeat the method steps 1202, 1204, 1206 and 1208. In one embodiment, step 1204 is not repeated following a positive determination at step 1210 and the compliance characteristic 1012 from a previous iteration of the method is retained.

Thus embodiments of the present invention provide a separation of concerns between a compliance assessment component 1006 and a compliance software component 1008. Such separation is advantageous where the resources for the deployed application 1000' can change at runtime, such as due to deployment of the application 1000' using a service based environment such as a cloud computing environment. In particular, the software component 1008 is selected to provide the actual parameter such that the selection of an appropriate software component is based on the data requirements for evaluating the compliance criterion 1014. Accordingly, where one or more of the resources 1022 changes, the selection of a software component can result in a different software component able to provide the actual parameter for the changed application. Thus the separation of concerns between the compliance assessment component 1006 and the software component 1008 provides for the selection of an appropriate software component based on the data requirements for evaluating the criterion 1014 and the resources 1022 instantiated for the deployed application 1000'.

Embodiments of the invention thus provide an adaptable approach to compliance assessment for software applications executing with service based infrastructures where resources can change at runtime, such as in response to platform or infrastructure reprovisioning, or where a platform or infrastructure exhibits characteristics of resource elasticity as is typical in cloud computing environments. Embodiments of the present invention further provide for such compliance assessment without a need to interrupt or redeploy the software application, or redeploy a compliance architecture.

Figure 9:
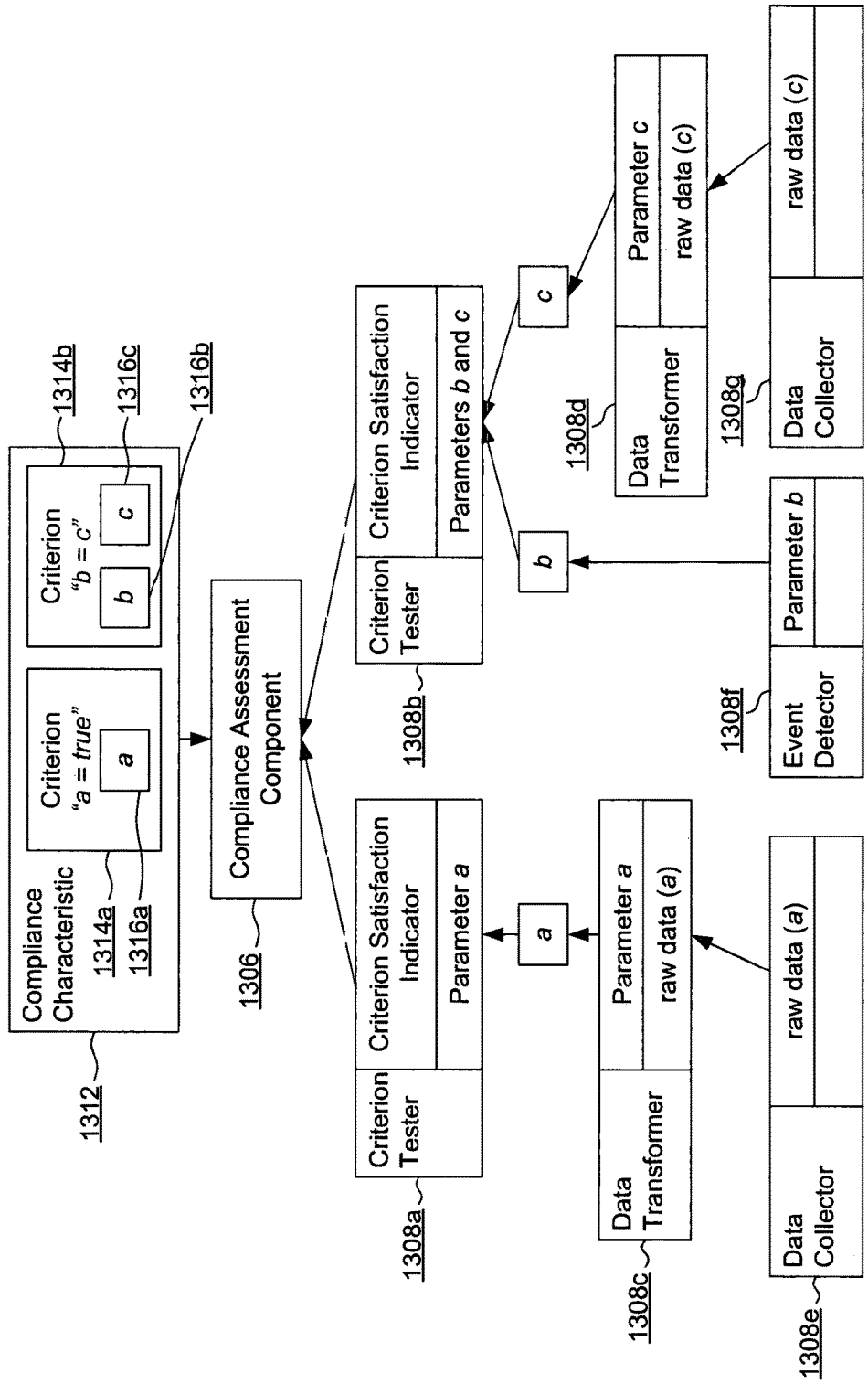
FIG. 9 is a schematic illustration of an arrangement for determining a level of compliance of the software application of FIG. 6 with a compliance characteristic in accordance with an exemplary embodiment of the present invention.

FIG. 9 is a schematic illustration of an arrangement for determining a level of compliance of the software application 1000' with a compliance characteristic 1312 in accordance with an exemplary embodiment of the present invention. The compliance characteristic 1312 includes two compliance criteria 1314a and 1314b being expressed in simplified form for ease of understanding. Compliance criterion 1314a is based on a formal parameter "a" 1316a. Compliance criterion 1314b is based on a formal parameter "b" 1316b.

A compliance assessment component 1306 is operable to determine a level of compliance of a software application 1000' with the compliance characteristic 1312. In the exemplary embodiment of FIG. 9 the compliance assessment component 1306 achieves this determination by selecting compliance software components 1308a and 1308b as "criterion tester" components operable to evaluate the compliance criteria 1314a and 1314b respectively. In an alternative embodiment the compliance assessment component 1306 is operable to test the criteria 1314a and 1314b itself, based on data provided by other compliance software components.

Compliance components 1308a and 1308b advertise their ability to provide "criteria satisfaction indicators" as output data items. Compliance component 1308a includes an identification of required data indicating that the component 1308a requires actual parameter data corresponding to parameter "a" 1316a. Compliance component 1308b includes an identification of required data indicating that the component 1308b requires actual parameter data corresponding to parameters "b" 1316b and "c" 1316c. Compliance component 1308a achieves its purpose by selecting a further compliance component 1308c, a "data transformer" compliance component. Component 1308c advertises its ability to provide actual parameter data corresponding to parameter "a" 1316a. Component 1308c further indicates its dependency on data indicated as "raw data (a)". To satisfy this dependency, component 1308c selects compliance component 1308e, a "data collector" compliance component. Component 1308e advertises its ability to provide data as "raw data (a)". Data collector component 1308e is operable to interface with one or more resources in the deployed application 1000' to access the raw data. For example, data collector 1308e can access a resource using an API for the resource, or by intervening in a data flow, or any other suitable access mechanism.

Compliance component 1308b achieves its purpose by obtaining actual parameter data corresponding to parameter "b" 1216b by selecting compliance component 1308f, an "event detector" compliance component. Component 1308f advertises its ability to provide actual parameter data corresponding to parameter "b" 1316b. Event detector component 1308f is operable to interface with one or more resources in the deployed application 1000' to detect events, generating actual parameter data corresponding to parameter "b" 1316b.

Compliance component 1308b further achieves its purpose by obtaining actual parameter data corresponding to parameter "c" 1316c by selecting compliance component 1308d, a "data transformer" compliance component. Component 1308d advertises its ability to provide actual parameter data corresponding to parameter "c" 1316c. Component 1308d further indicates its dependency on data indicated as "raw data (c)". To satisfy this dependency, component 1308d selects compliance component 1308g, a "data collector" compliance component. Component 1308e advertises its ability to provide data as "raw data (c)". Data collector component 1308g is operable to interface with one or more resources in the deployed application 1000' to access the raw data, such as is described above with respect to component 1308e.

Thus, each compliance component 1308a to 1308d can provide further information by supplementing, adapting, processing, verifying or reacting to the data from downstream components. In this way it is possible to separate the concerns of the compliance components 1308a to 1308g. Such separation is advantageous when information from multiple information sources is required to determine a level or extent of compliance with a compliance characteristic 1312. For example, different compliance software components can enjoy different privileges in relation to a deployed application such that one compliance software component may have trusted access to resources that another compliance software component does not have. Further, complex deployed applications can have associated many and varied compliance characteristics, each having potentially many and varied compliance criteria. Such criteria can relate to numerous and differing resources required for application deployment, with the differing resources having associated information in a multiplicity of forms. Where there are overlaps in information requirements to assess a level or extent of compliance with multiple compliance characteristics it is advantageous to centralise data gathering for a resource such that any duplication in the retrieving or obtaining of data for assessing compliance criteria is reduced. Further, it is advantageous to distribute responsibility for information collection between compliance software components which can specialise in, dedicate to, relate to or associate with particular resources, data formats, information types, information gathering methods or other variable attributes for a deployed application. Such distribution reduces a degree of coupling in the compliance determination methods and systems and further provides for a granular approach to information gathering.

The approach to determining a level of compliance described with reference to the exemplary embodiments is particularly advantageous in service based software environments such as cloud computing environments. The elasticity of such service based technologies can result in adaptations or modifications to the resources employed in and for a deployed application, including changes in real-time at runtime. Elasticity can also result in the supplementing of resources with additional resources or the replacement of resources with alternative or new resources. Such changes to the resources for a deployed application require repeat assessment of compliance characteristics to ensure a determination of an extent or level of compliance accurately reflects a current configuration of the application. This is particularly important where a particular minimum level of compliance is required for continuing operation of the deployed application such as, for example, to ensure a requisite level of security is provided. The selection of compliance components by a compliance assessment component and/or other compliance components can be undertaken dynamically at runtime. Accordingly, compliance components can change along with the resources for a deployed application.

Selection of, and communication between, compliance components such as components 1308a to 1308g can be achieved using any suitable mechanism known in the art including inter alia: a directory system; a publish-subscribe infrastructure; a request-response protocol; and a message passing scheme such as a brokered messaging infrastructure. In one example, the identifications of data provided by each compliance component can be stored in a directory accessible to other compliance components and/or the compliance assessment component such that when a compliance component is required for a particular data type, parameter or data item, identification of a suitable compliance component can be achieved by reference to the directory.

In a second example, a compliance component can advertise an identification of data it is capable of providing by publishing messages over a publish-subscribe infrastructure such that subscribing components, such as other compliance components or a compliance assessment components, are able to receive such publications by subscribing to receive such publications, such as by subscribing on a topic basis. A topic scheme can be devise, as is known in the art, whereby publications on a particular topic are related. One approach to implementing such a topic scheme uses an identification of a type of data from a global namespace of data types, such as an identification of a formal parameter, such that compliance components requiring data of that type can subscribe to publications on that topic.

In a third example, compliance components can communicate with each other directly or via a compliance assessment component using a predefined protocol such as a request-response protocol. Such a protocol can include a definition of messages for requesting an identification of data provided by a compliance component and requesting data itself. Using such a protocol, compliance components can form a compliance component network having one of any number of potential topologies including, inter alia, hierarchical, star, tree, mesh or combinations thereof.

In a fourth example, compliance components can communicate with each other via a message passing scheme such as a brokered messaging infrastructure. Message broker components are suitable for communicating messages between entities in connected networks of entities and can further adapt or translate messages where communicating components have different formats, styles or needs. Such messages can be used to communicate information about compliance components such as indications of data provided by components. Further, messages can be used to request and receive data from components.

Thus, FIG. 9 illustrates how the compliance components are operable to interoperate to provide potentially multiple layers of data abstraction and granularity, for example ranging from raw data to evidence about compliance criterion satisfaction; and/or multiple data collection or transformation components that enable, for example, the fusion, aggregation, Measurement, determination or derivation of data and/or evidence of compliance requirement satisfaction.

Figure 10:
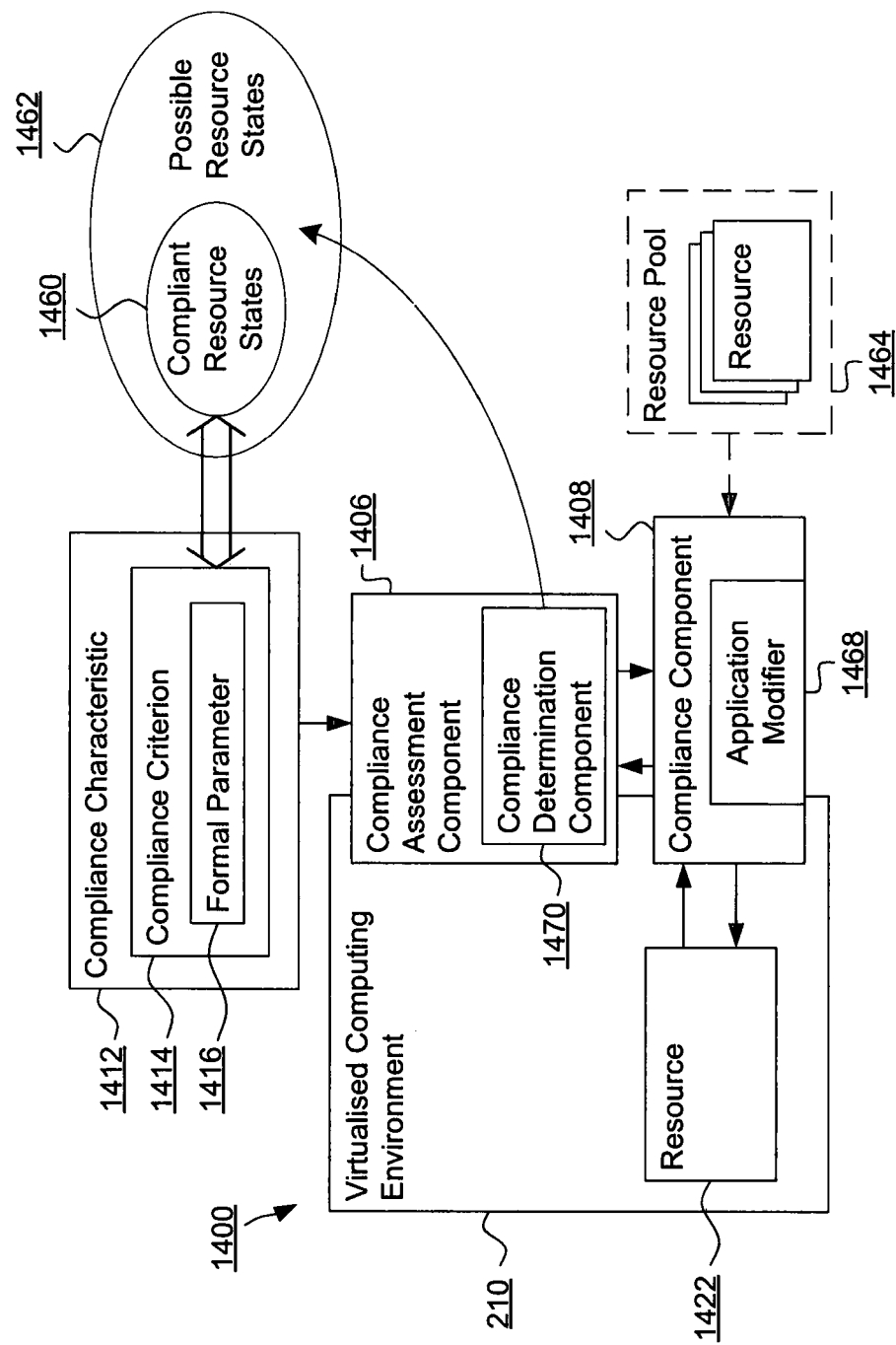
FIG. 10 is a illustrates components operable in a compliance enforcement process for a deployed software application executing with a virtualized computing environment in accordance with a preferred embodiment of the present invention.

FIG. 10 is a illustrates components operable in a compliance enforcement process for a deployed software application 1400 executing with a virtualized computing environment 210 in accordance with a preferred embodiment of the present invention. The deployed software application 1400 includes a resource 1422 such as a platform, infrastructure, service, software, dataflow or other resource instantiated for the deployment of the application 1400. Notably, the resource 1422 can be external to either or both the application 1400 and the virtualized computing environment 210. A compliance assessment component 1406 is operable to evaluate a level or extent of compliance of the software application 1400 with a compliance characteristic 1412. In doing so, the compliance assessment component 1406 operates with a compliance software component 1408 as previously described. A compliance criterion 1414 for the compliance characteristic 1412 is suitable for defining a set 1460 of compliant resource states for the resource 1422. The set 1460 of compliant resource states is a subset of a set 1462 of multiple possible resource states for the resource 1422. The set 1462 of multiple possible resource states does not necessarily include all possible resource states. In one embodiment, the set 1462 of possible resource states is defined to be the universe of all states. In an alternative embodiment the set 1462 of possible resource states is not explicitly defined. It will be appreciated by those skilled in the art that one or more compliance criteria associated with one or more compliance characteristics may define one or more sets of compliant states for one or more resources instantiated for the deployed application 1400. For example, a set of compliant states can include a state of a combination of multiple resources instantiated for the application 1400. Further it will be appreciated that the sets 1460 and 1462 of application states may correspond to states of the deployed application 1400 as a whole, which may itself be characterized by states of resources deployed for the application 1400.

An exemplary compliance criterion 1414 is a criterion that all data communicated via a dataflow resource between a sender resource and a receiver resource is encrypted. The exemplary criterion defines a compliant state of the dataflow resource being a state in which the data on the dataflow resource is encrypted. Elaborating the example, the exemplary criterion can be considered to define multiple states of the dataflow resource, such as: a state in which the data on the dataflow resource is encrypted with a 64 bit key; and a state in which the data on the dataflow resource is encrypted with a 128 bit key. Such compliant states constitute the set 1460. The set 1462 can include additionally a state in which the data on the dataflow resource is not encrypted.

The compliance assessment component 1406 includes a compliance determination component 1470. The compliance determination component 1470 is a software or hardware component operable to determine if a current state of the resource 1422 is outside the set 1460 of compliant resource states. The current state of the resource 1422 is determined based on evidence provided by the compliance software component 1408. While a single compliance component 1408 is illustrated in FIG. 10 it will be appreciated that a network, hierarchy or other arrangement of multiple compliance components could be employed as previously described. The compliance component 1408 provides evidence to the compliance determination component 1470 for making the determination. When the compliance determination component 1470 determines that the state of the resource 1422 is outside the set 1460 of compliant resource states, the deployed software application 1400 is modified such that the application 1400 includes a resource having a state within the set 1460 of compliant resource states. Accordingly, such modification of the application 1400 constitutes enforcement of the compliance characteristic 1412.

Modification of the application 1400 is undertaken by an application modifier 1468 of the compliance component 1408. One example of a modification the application modifier 1468 can apply to the application 1400 is the introduction of one or more additional resources from a pool of resources 1464. Such additional resources can be selected by the application modifier 1468 such that the resources are operable in a state within the set 1460 of compliant states. Another example of a modification the application modifier 1468 can apply to the application 1400 is the replacement of the resource 1422 with one or more resources from a pool of resources 1464, such replacement resources being operable in a state within the set 1460 of compliant states. A further example of a modification by the application modifier 1460 is a modification to a configuration, arrangement, instantiation or deployment of the resource 1422, or other resources associated with the application 1400, such that the resource 1422 is operable to transition to a state within the set 1460 of compliant states. Thus after modification by the application modifier 1468, the application 1400 has a resource having a state within the set 1460 of compliant resource states and the compliance characteristic 1412 has been enforced.

It will be appreciated that the compliance assessment component 1406 can be further operable to repeat the evaluation of a level or extent of compliance of the software application 1400 with a compliance characteristic 1412. Such repeated evaluations by the compliance assessment component 1406 can occur in accordance with a predefined schedule, in response to a modification to the application 1400, in response to a reprovisioning of resources for the application by a service provider such as a cloud computing service provider, or based on any other suitable trigger. Thus a cycle of evaluating a level or extent of compliance and enforcing compliance via the application modifier 1468 can ensure an ongoing and up-to-date assessment and enforcement of the compliance characteristic 1412. This is particularly advantageous where the application 1400 is deployed to a service based environment or infrastructure which exhibits characteristics of elasticity in resource provisioning.

While the arrangement of FIG. 10 shows the compliance determination component 1470 being comprised within the compliance assessment component 1406 and the application modifier 1468 being comprised in the compliance component 1408, it will be appreciated that such an arrangement is purely exemplary. The compliance determination component 1470 and/or the application modifier 1468 can be is associated with, or included in, the compliance software component 1408 or a compliance software component cooperating with the component 1408. In an preferred embodiment the compliance assessment component 1406 is operable to communicate the compliance criterion 1414 to the compliance component 1408 such that the compliance component 1408 is operable to determine the extent of the set 1460 of compliant resource states. It will be appreciated that multiple compliance components can be employed and accordingly the compliance criterion 1414, or information about the compliance criterion 1414, can be shared with and between such multiple compliance components. This is particularly advantageous where compliance components are distributed in association with resources throughout the deployed application 1400 such that different compliance components collect data from, and/or undertake enforcement operations in respect of, different resources.

Figure 11B:
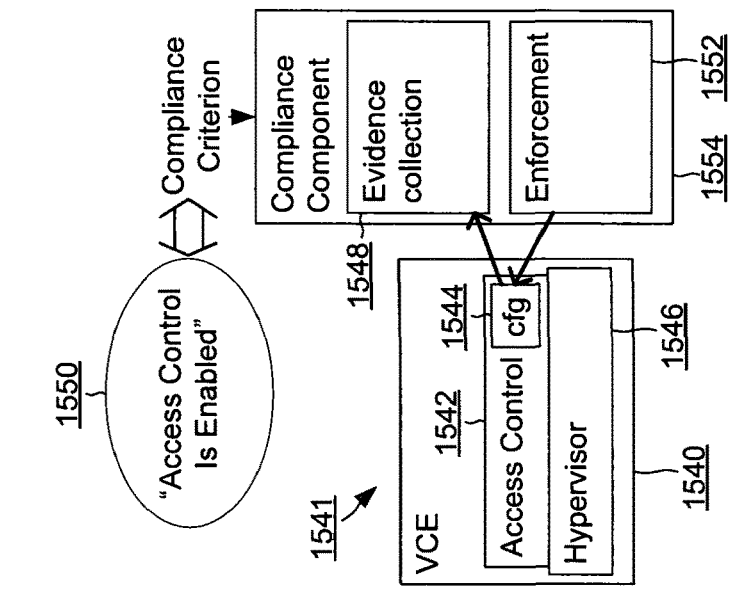
FIGS. 11a to 11d are exemplary component diagrams illustrating compliance enforcement processes in use for exemplary applications deployed with virtual computing environments in accordance with preferred embodiments of the present invention.
Figure 11A:
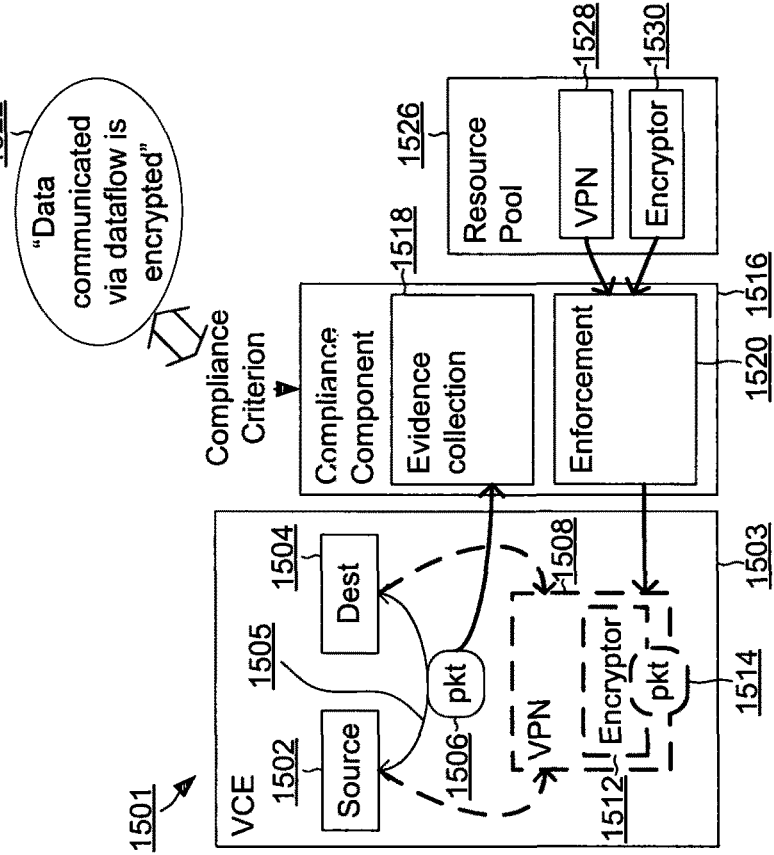

FIG. 11*a* is a first exemplary component diagram illustrating a compliance enforcement process in use for an exemplary application 1501 deployed with a virtual computing environment 1503 in accordance with an exemplary embodiment of the present invention. The application 1501 includes a source resource 1502, such as a first software component, communicating via a dataflow resource 1505 with a destination resource 1504, such as a second software component. The dataflow 1505 is illustrated as linking the source 1502 and destination 1504 and has a packet 1506 of information illustrated in communication via the dataflow 1505. A compliance component 1516 includes an evidence collection module 1518 and an enforcement module 1520. The compliance component 1516 receives a compliance criterion or information about a compliance criterion. In the illustrative arrangement of FIG. 11*a* the compliance criterion is defined as "packets communicated via the dataflow 1505 must be encrypted". Thus the compliance criterion defines a set 1522 of compliant resource states for the dataflow 1505 including a state in which packet 1506 communicated via the dataflow 1505 is encrypted.

In use, the evidence collection module 1518 is operable to collect information about the packet 1506 from the application 1501. For example, evidence collection component 1518 is operable in a trusted mode of operation with respect to the application 1501 and/or the virtualized computing environment 1503 such that the module 1518 accesses one or more of, inter alia: the contents of the packet 1506; an interface of the source and/or destination resources 1502, 1504 through which requests can be communicated to the source and/or destination resources 1502, 1504; and configuration information relating to the source and/or destination resources 1502, 1504. Through the information accessible to the evidence collection component 1518 data is collected that can be used to generate evidence of a state of the dataflow 1505 and, in particular, a state of encryption of data communicated via the dataflow 1505. Subsequently, a compliance determination component (not illustrated in FIG. 11*a*) determines if the state of the dataflow 1505 is within the set 1522 of compliant states. The compliance determination component may constitute part of the evidence collection component 1518, the compliance component 1516, the enforcement component 1520 or a compliance assessment component (not illustrated in FIG. 11*a*) cooperating with the compliance component 1518.

The arrangement of FIG. 11*a* illustrates the case where the state of the dataflow 1505 is not within the set 1522 of compliant states. Accordingly, the enforcement component 1520 is operable to modify the software application 1501 to include one or more resources with a state belonging to the set of compliant states 1522. The enforcement component 1520 includes an application modifier for retrieving new resources from a resource pool 1526 in order to modify the resources instantiated for the application 1501. In particular, the resource pool includes a virtual private network (VPN) resource 1528 and an encryptor resource 1530. The VPN 1528 is operable to provide a virtual network via which the dataflow 1505 can be passed such that virtual network is not visible to either the source or destination components 1502, 1504. The encryptor 1530 is a software component operable to receive unencrypted input data and provide encrypted output data. In use, the application modifier of the enforcement component 1520 modifies the application 1501 by channeling the dataflow 1505 through a new VPN resource 1508 such that a new encryptor resource 1512 can encrypt data communicated via the dataflow 1505. Accordingly packets 1514 communicated via the dataflow 1505 of the application 1501 after modification will be subject to the components of the application shown in broken lines.

Subsequently, the compliance component 1516 in conjunction with a compliance assessment component is operable to determine an extent or level of compliance of the modified application 1501. Such an assessment will determine that the dataflow resource 1505 has a state within the set 1522 of compliant states due to the modification of the application 1501 by the application modifier.

FIG. 11*b* is a second exemplary component diagram illustrating a compliance enforcement process in use for an exemplary application 1541 deployed with a virtual computing environment 1540 in accordance with an exemplary embodiment of the present invention. The application 1541 includes a hypervisor resource 1546 having executing thereon an access control resource 1542. The access control resource 1542 has associated a configuration 1544. A compliance component 1554 includes an evidence collection module 1548 and an enforcement module 1552. The compliance component 1554 receives a compliance criterion or information about a compliance criterion. In the illustrative arrangement of FIG. 11*b* the compliance criterion is defined as "access control resources have a configuration that is enabled". Thus the compliance criterion defines a set 1550 of compliant resource states for the access control configuration 1544 including a state in which access control configuration 1544 is enabled.

In use, the evidence collection module 1548 is operable to collect information about the access control configuration 1544 from the application 1541. For example, evidence collection component 1548 is operable in a trusted mode of operation with respect to the application 1541 and/or the virtualized computing environment 1540 such that the module 1548 accesses one or more of, inter alia: the contents of the configuration 1544; an interface of the access control resource 1542 through which requests can be communicated regarding the configuration 1544; and the hypervisor 1546 through which requests can be communicated regarding the access control resource 1542 and/or the configuration 1544. Through the information accessible to the evidence collection component 1548 data is collected that can be used to generate evidence of a state of the access control configuration 1544 and, in particular, a state of enablement of the access control configuration 1544. Subsequently, a compliance determination component (not illustrated in FIG. 11*b*) determines if the state of the access control configuration 1544 is within the set 1550 of compliant states.

Where a state of the access control configuration 1544 is not within the set 1550 of compliant states, the enforcement component 1552 is operable to modify the software application 1541 to include one or more resources with a state belonging to the set of compliant states 1550. In particular, the enforcement component 1552 includes an application modifier for directly modifying the access control configuration 1544 for the application 1541 such that the access control configuration 1544 is set to an enabled state.

Subsequently, the compliance component 1554 in conjunction with a compliance assessment component is operable to determine an extent or level of compliance of the modified application 1541. Such an assessment will determine that the access control configuration 1544 has a state within the set 1550 of compliant states due to the modification of the application 1541 by the application modifier.

In an extension to the exemplary arrangement of FIG. 11*b*, the application 1541 is a web application allowing communication over transmission control protocol (TCP) ports 80 (normally reserved for hypertext transport protocol (HTTP) communications) and 21 (normally reserved for file transfer protocol (FTP) communications). While the application allows communication over both ports 80 and 21, the application 1541 provides a server or daemon process supporting HTTP on port 80, leaving port 21 unused but open for communication. Thus, port 80 is configured for communication while port 21 is not configured but is open for communication. In the extension to the embodiment of FIG. 11*b* the access control resource 1542 is a firewall resource providing network communication security facilities including allowing or preventing communication over defined network paths including TCP ports. In the extension to the embodiment of FIG. 11*b* the compliance criterion is further defined as "only configured TCP ports are open for communication". Thus, in the extension of the embodiment of FIG. 11*b*, the compliance criterion defines a set 1550 of compliant resource states for the access control configuration 1544 including a state in which access control configuration 1544 is operable to prevent communication via ports that are not configured. Thus, in use, the evidence collection component 1548 in the extended embodiment is operable, in conjunction with resources of the deployed application 1541, to determine which TCP ports are configured and which TCP ports are open for communication. This determination can be based on an inspection of a configuration of the application 1541 or by sending requests to an interface of resources for the application 1541. Alternatively, the determination can be based on measurements or testcases conducted by the evidence collection component 1548, such as a port scan to identify open TCP ports and a resource scan to identify which resources are operable with open TCP ports to determine configured ports. In the extended embodiment, if there are open TCP ports that are not configured then the enforcement component 1552 is operable to configure the proxy 1544 to prevent communication over non-configured ports. Thus the extended exemplary embodiment of FIG. 11*b* illustrates an example in use for compliance assessment and enforcement.

Figure 11D:
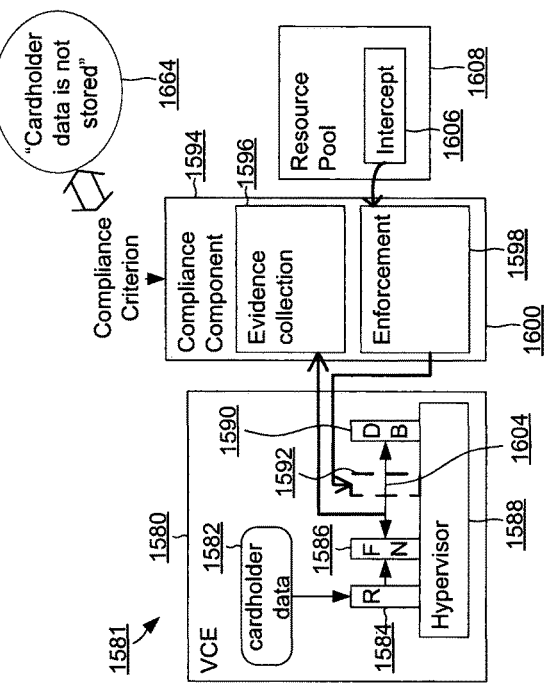
Figure 11C:
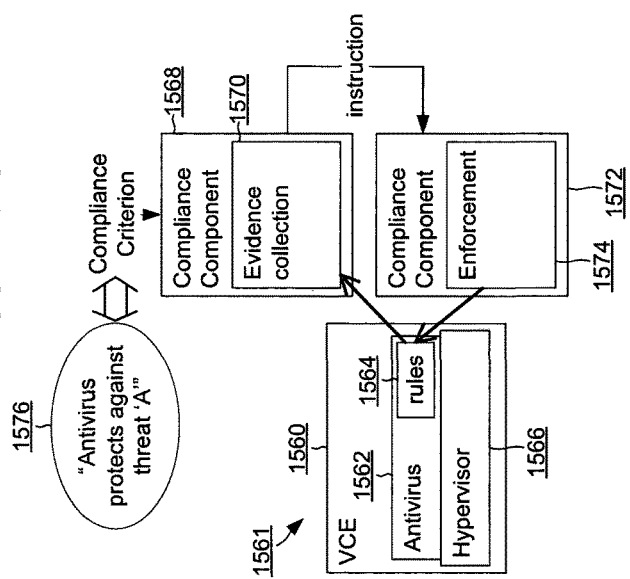

FIG. 11*c* is a third exemplary component diagram illustrating a compliance enforcement process in use for an exemplary application 1561 deployed with a virtual computing environment 1560 in accordance with an exemplary embodiment of the present invention. The application 1561 includes a hypervisor resource 1566 having executing thereon an antivirus resource 1562. The antivirus resource 1562 has associated rules 1564 reflecting threats the antivirus resource 1562 is operable to protect against. A first compliance component 1568 includes an evidence collection module 1570. A second, separate, compliance component 1572 includes an enforcement module 1574. The first compliance component 1568 receives a compliance criterion or information about a compliance criterion. In the illustrative arrangement of FIG. 11*c* the compliance criterion is defined as "antivirus resources protect against specific threat 'A'". Thus the compliance criterion defines a set 1576 of compliant resource states for the antivirus rules 1564 including a state in which the rules 1564 include protection against a specific threat 'A'.

In use, the evidence collection module 1570 is operable to collect information about the antivirus rules 1564 from the application 1561. For example, evidence collection component 1570 is operable in a trusted mode of operation with respect to the application 1561 and/or the virtualized computing environment 1560 such that the module 1570 accesses one or more of, inter alia: the contents of the antivirus rules 1564; an interface of the antivirus resource 1562 through which requests can be communicated regarding the rules 1564; and the hypervisor 1566 through which requests can be communicated regarding the antivirus resource 1562 and/or the rules 1564. Through the information accessible to the evidence collection component 1570 data is collected that can be used to generate evidence of a state of the antivirus rules 1564 and, in particular, whether the rules 1564 include protection against specific threat 'A'. Subsequently, a compliance determination component (not illustrated in FIG. 11*c*) determines if the state of the antivirus rules 1564 is within the set 1576 of compliant states.

Where a state of the antivirus rules 1564 is not within the set 1576 of compliant states, the first compliance component 1568 is operable to select the second compliance component 1572 for an enforcement operation. The selection of the second compliance component 1572 can be based on information provided by the second compliance component 1572 such as an indication by the second compliance component 1572 of functions and facilities provided by the second compliance component 1572. For example, the second compliance component 1572 can advertise resources of the application 1561 for which the second compliance component 1572 is operable to undertake enforcement operations. Such advertisement or communication of the capabilities of the second compliance component 1572 can be communicated to the first compliance component via a broadcast communication, a publish/subscribe mechanism, a request/ response protocol or other suitable communication means. Thus, the first compliance component 1568 instructs the second compliance component 1572 to enforce the compliance criterion. The instruction will therefore include the compliance criterion, or information about the compliance criterion, such that the second compliance component has sufficient information to apply an appropriate enforcement action.

The enforcement component 1574 of the second compliance component 1572 includes an application modifier operable to modify the software application 1561 to include one or more resources with a state belonging to the set of compliant states 1576 in accordance with the instruction from the first compliance component 1568. For example, the enforcement component 1574 can include an application modifier for directly modifying the antivirus rules 1564 such that rules protection against threat 'A' are provided. Alternatively, the application modifier can be operable to instruct the antivirus resource 1562 to undertake an upgrade, update, reinstall or other operation suitable to retrieving new or additional rules 1564. In a further alternative, the application modifier can be operable to retrieve a new resource suitable for providing antivirus functionality and including protection against threat 'A'.

Subsequently, the compliance component 1568 in conjunction with a compliance assessment component is operable to determine an extent or level of compliance of the modified application 1561. Such an assessment will determine that the antivirus rules 1564 have a state within the set 1576 of compliant states due to the modification of the application 1561 by the application modifier.

FIG. 11*d* is a fourth exemplary component diagram illustrating a compliance enforcement process in use for an exemplary application 1581 deployed with a virtual computing environment 1580 in accordance with an exemplary embodiment of the present invention. The application 1581 includes a hypervisor 1588 having executing thereon: a receiver software resource 1584; an application function software resource 1586; and a database resource 1590. In operation the application 1581 receives cardholder data 1582 at the receiver 1584 such as credit card information for a cardholder. The receiver 1584 communicates the cardholder data to the application function 1586 which in turn accesses the database 1590 via dataflow 1604 for the storage and retrieval of information. A compliance component 1594 includes an evidence collection module 1596 and an enforcement module 1598. The compliance component 1596 receives a compliance criterion or information about a compliance criterion. In the illustrative arrangement of FIG. 11*d* the compliance criterion is defined as "cardholder data 1582 is not stored". Thus the compliance criterion defines a set 1664 of compliant resource states for the dataflow 1604 including a state in which information communicated for storage to the database 1590 via the dataflow 1604 does not include cardholder data 1582.

In use, the evidence collection module 1596 is operable to collect information about the dataflow 1604 from the application 1581. For example; evidence collection component 1596 is operable in a trusted mode of operation with respect to the application 1581 and/or the virtualized computing environment 1580 such that the module 1518 accesses one or more of, inter alia: the contents of data communicated via the dataflow 1604; an interface of the application function 1586 and/or the database 1590 through which requests can be communicated; and the contents of the cardholder data 1582 accessed directly or via the receiver 1584 or the application function 1586. Through the information accessible to the evidence collection module 1596 data is collected that can be used to generate evidence of a state of the dataflow 1604 and, in particular, a state of the contents of data communicated over the dataflow 1604 in respect of the cardholder data 1582. Subsequently, a compliance determination component (not illustrated in FIG. 11*d*) determines if the state of the dataflow 1604 is within the set 1664 of compliant states.

The arrangement of FIG. 11*d* illustrates the case where the state of the dataflow 1604 is not within the set 1664 of compliant states. Accordingly, the enforcement component 1598 is operable to modify the software application 1581 to include one or more resources with a state belonging to the set of compliant states 1664. The enforcement component 1598 includes an application modifier for retrieving new resources from a resource pool 1608 in order to modify the resources instantiated for the application 1581. In particular, the resource pool includes an intercept resource 1606 such as a dataflow proxy, software router or other software component operable to intercept communication across a dataflow such as dataflow 1604. In use, the application modifier of the enforcement component 1598 modifies the application 1581 by introducing the interceptor resource 1606 as a new resource 1592 in the application 1581 to intercept all communications between the application function 1586 and the database 1590. The new resource 1592 is further operable to redact, excise, remove, overwrite or otherwise remove any data originating from cardholder data 1582 communicated via the dataflow 1604. Accordingly information communicated via the dataflow 1604 of the application 1581 after modification will be subject to the components of the application shown in broken lines in FIG. 11*d*. The removal of cardholder data from information communicated via the dataflow 1604 will preclude the storage of cardholder data in the data store 1590.

Subsequently, the compliance component 1594 in conjunction with a compliance assessment component is operable to determine an extent or level of compliance of the modified application 1581. Such an assessment will determine that the dataflow resource 1604 has a state within the set 1664 of compliant states due to the modification of the application 1581 by the application modifier.

Thus an application can be transitioned to a compliant state by modification of the application by an application modifier. Further, operation of at least a compliance determination component and an application modifier can be repeated in response to changes to the application or one or more resources instantiated for the application, such as a reprovisioning of IaaS, PaaS or cloud computing resources for the application. Thus compliance can be assessed and enforced for applications operating with environments exhibiting characteristics of elasticity.

In accordance with embodiments of the present invention, the identified extent or level of compliance is suitable for affecting the operation of the application when deployed and the configuration of a virtualized computing environment. Embodiments of the present invention provide a compliance enforcement function where compliance requirements defining technical requirements of an application are imposed on the application automatically at runtime of the application based on an assessment of a level or extent of compliance of the application according to embodiments of the present invention. Yet further, embodiments of the present invention can be operable to provide safety, security, reliability and/or stability features of an application by assessing a level or extent of compliance of the application with technical compliance requirements for assuring a predefined level of safety, security, reliability and/or/stability and indicating such level to inform a determination of future operation and/or to inform a compliance enforcement process. Thus applications that are safety critical, security critical or high-reliability critical can be monitored and affected using the approaches described with respect to embodiments of the present invention.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. An apparatus for enforcing a compliance requirement for a software application in execution in a virtualized computing environment, the apparatus comprising:
at least one processor and a memory, the memory comprising instructions executable by the at least one processor to control the apparatus to at least:
(a) identify a resource instantiated for execution of the application;
(b) retrieve a compliance characteristic for the application, the compliance characteristic being retrieved based on the identified resource and having associated a compliance criterion based on a formal parameter, the compliance criterion defining a set of states for the instantiated resource that comply with the compliance criterion and therefore constitute compliant resource states;
(c) select a software component for providing an actual parameter corresponding to the formal parameter, the actual parameter being based on data concerning the resource;
(d) evaluate the compliance criterion using the actual parameter;
(e) in response to a determination that the resource has a state that is outside the set of compliant resource states, the determination being based on the evaluation of the compliance criterion, modify the software application to a modified software application having associated a resource with a state belonging to the set of compliant resource states; and
(f) repeatedly monitor for change to one or more of the resources,
wherein (a), (b), and (d) are responsive to each detection that one or more resources is/are changed, and
wherein, in (c), the selected software component is selected based on an identification of one or more data items providable by the software component.

2. The apparatus of claim 1, wherein the modification in (e) further includes instantiating one or more additional resources from a pool of resources for the software application.

3. The apparatus of claim 1, wherein the modification in (e) further includes replacing the resource with a new resource.

4. The apparatus of claim 1, wherein the modification in (e) further includes modifying a configuration of the resource.

5. The apparatus of claim 1, wherein:
the identified resource is a first resource instantiated for execution of the application,
the memory comprises further instructions executable by the at least one processor to control the apparatus to at least identify a second resource instantiated for execution of the application, and
the modification of the software application in (e) further includes modifying the second resource.

6. The apparatus of claim 1, wherein the software component is a first software component and, in response to the determination, a second software component that is configured to undertake the modification in (e) is selected during the selection of (c).

7. The apparatus of claim 1 wherein the compliance criterion is a first criterion in a set of multiple compliance criteria for the compliance characteristic, each of the multiple compliance criteria being based on a formal parameter,
wherein one or more additional software components is/are selected in (c) to provide an actual parameter corresponding to a formal parameter for each other criterion in the set of multiple compliance criteria, and
wherein the evaluation of (d) further comprises evaluating each of the compliance criteria using a corresponding actual parameter to determine the level of compliance.

8. The apparatus of claim 1, wherein the data concerning the resource is raw data from the resource, and wherein the actual parameter is extracted from the raw data.

9. The apparatus of claim 8, wherein the selected software component is selected in response to a known ability to generate the one or more data items using the actual parameter, and wherein the one or more data items are relevant to the compliance criterion.

10. The apparatus of claim 1, wherein the selected software component is selected from a plurality of different candidate software components, each of these software components being configured to provide one or more data items related to a resource.

11. The apparatus of claim 1, wherein (a)-(f) are performed while the application is running in the virtualized computing environment, and wherein the data concerning the resource is raw data from the resource.

12. A method for enforcing a compliance requirement for a software application in execution in a virtualized computing environment, the method comprising:
(a) identifying a resource instantiated for execution of the application;
(b) retrieving a compliance characteristic for the application, the compliance characteristic being retrieved based on the identified resource and having associated a compliance criterion based on a formal parameter, the compliance criterion defining a set of states for the instantiated resource that comply with the compliance criterion and therefore constitute compliant resource states;
(c) selecting a software component for providing an actual parameter corresponding to the formal parameter, the actual parameter being based on data concerning the resource;
(d) evaluating the compliance criterion using the actual parameter;
(e) in response to a determination that the resource has a state that is outside the set of compliant resource states, the determination being based on the evaluation of the compliance criterion, modifying the software application to a modified software application having associated a resource with a state belonging to the set of compliant resource states; and
(f) repeatedly monitoring for change to one or more of the resources,
wherein (a), (b), and (d) are responsive to each detection that one or more resources is/are changed, and
wherein, in (c), the selection of the software component is based on an identification of one or more data items providable by the software component.

13. The method of claim 12, wherein modifying the software application includes instantiating one or more additional resources from a pool of resources for the software application.

14. The method of claim 12, wherein modifying the software application includes replacing the resource with a new resource.

15. The method of claim 12, wherein modifying the software application includes modifying a configuration of the resource.

16. The method of claim 12, wherein the identified resource is a first resource instantiated for execution of the application, the method further comprising identifying a second resource instantiated for execution of the application, wherein modifying the software application includes modifying the second resource.

17. The method of claim 12, wherein the software component is a first software component, the method further comprising in further response to the determination, selecting a second software component, wherein the second software component is configured to undertake the modifying.

18. The method of claim 12, wherein the compliance criterion is a first criterion in a set of multiple compliance criteria for the compliance characteristic, each of the multiple compliance criteria being based on a formal parameter,
wherein the selecting further comprises selecting one or more additional software components for providing an actual parameter corresponding to a formal parameter for each other criterion in the set of multiple compliance criteria, and
wherein the evaluating step further comprises evaluating each of the compliance criteria using a corresponding actual parameter to determine the level of compliance.

19. A non-transitory computer program product comprising computer program code to, when loaded into a computer system and executed thereon, cause the computer to enforce a compliance requirement for a software application in execution in a virtualized computing environment by performing functionality comprising:
(a) identifying a resource instantiated for execution of the application;
(b) retrieving a compliance characteristic for the application, the compliance characteristic being retrieved based on the identified resource and having associated a compliance criterion based on a formal parameter, the compliance criterion defining a set of states for the instantiated resource that comply with the compliance criterion and therefore constitute compliant resource states;
(c) selecting a software component for providing an actual parameter corresponding to the formal parameter, the actual parameter being based on data concerning the resource;
(d) evaluating the compliance criterion using the actual parameter;
(e) in response to a determination that the resource has a state that is outside the set of compliant resource states, the determination being based on the evaluation of the compliance criterion, modifying the software application to a modified software application having associated a resource with a state belonging to the set of compliant resource states; and
(f) repeatedly monitoring for change to one or more of the resources,
wherein (a), (b), and (d) are responsive to each detection that one or more resources is/are changed, and
wherein, in (c), the selection of the software component is based on an identification of one or more data items providable by the software component.

* * * * *